United States Patent [19]

Green et al.

[11] Patent Number: 5,728,023
[45] Date of Patent: Mar. 17, 1998

[54] PLASTIC CHAIN, MODULE AND SPROCKET CLUSTER

[76] Inventors: Arthur G. Green, 15654 Ridge Estates Dr.; David B. Palley, 103 Providence Mine Rd., Suite 204, both of Nevada City, Calif. 95959

[21] Appl. No.: 654,226

[22] Filed: May 28, 1996

Related U.S. Application Data

[63] Continuation-in-part of Ser. No. 281,775, Jul. 27, 1994, Pat. No. 5,520,585.
[51] Int. Cl.⁶ .................................................. F16G 13/02
[52] U.S. Cl. .................................... 474/206; 474/207
[58] Field of Search .............................. 474/206, 207, 474/212–217

[56] References Cited

U.S. PATENT DOCUMENTS

| | | | |
|---|---|---|---|
| 3,628,834 | 12/1971 | Anderson | 474/207 X |
| 5,125,874 | 6/1992 | Fryer et al. | 474/207 X |
| 5,320,584 | 6/1994 | Hynes | 474/207 |
| 5,520,585 | 5/1996 | Green et al. | 474/206 |

*Primary Examiner*—Roger J. Schoeppel

[57] ABSTRACT

A chain constructed of adjacent modules connected in end to end succeeding relationship serves many chain and drive belt uses, including for use as a chain drive, a cog belt drive, and as a fan belt with V-groove pulleys. The modules are of one or more parts, each part being of plastic, metal, or plastic encased metal. Various means of constructing and joining the modules are disclosed; some of these emphasize ease of assembly and disassembly. Each assembled module is without moving parts. To facilitate transmission of torque in drive applications, the module is shaped generally in one or more of the following ways: (1) with a cavity between its front and rear ends for receiving a tooth of a sprocket wheel; (2) with a body portion fitted in transverse cross section to the surfaces of one or more V-belt pulleys; or (3) with a body portion fitted in longitudinal cross section to a cavity of a cog wheel. Each pair of adjacent modules has a transverse pin or pins extending from one module into a transverse pin-receiving socket or sockets of the other module so as to form a rotatable joint between the modules. Also disclosed is a cogwheel which combines cog and V-belt features and a cogwheel cluster consisting of stair-stepped multiple concentric rings of such cogwheels sharing a common support infrastructure. The chain and cluster are light-weight and non-rusting; they can be also self-lubricating and/or colorful.

20 Claims, 27 Drawing Sheets

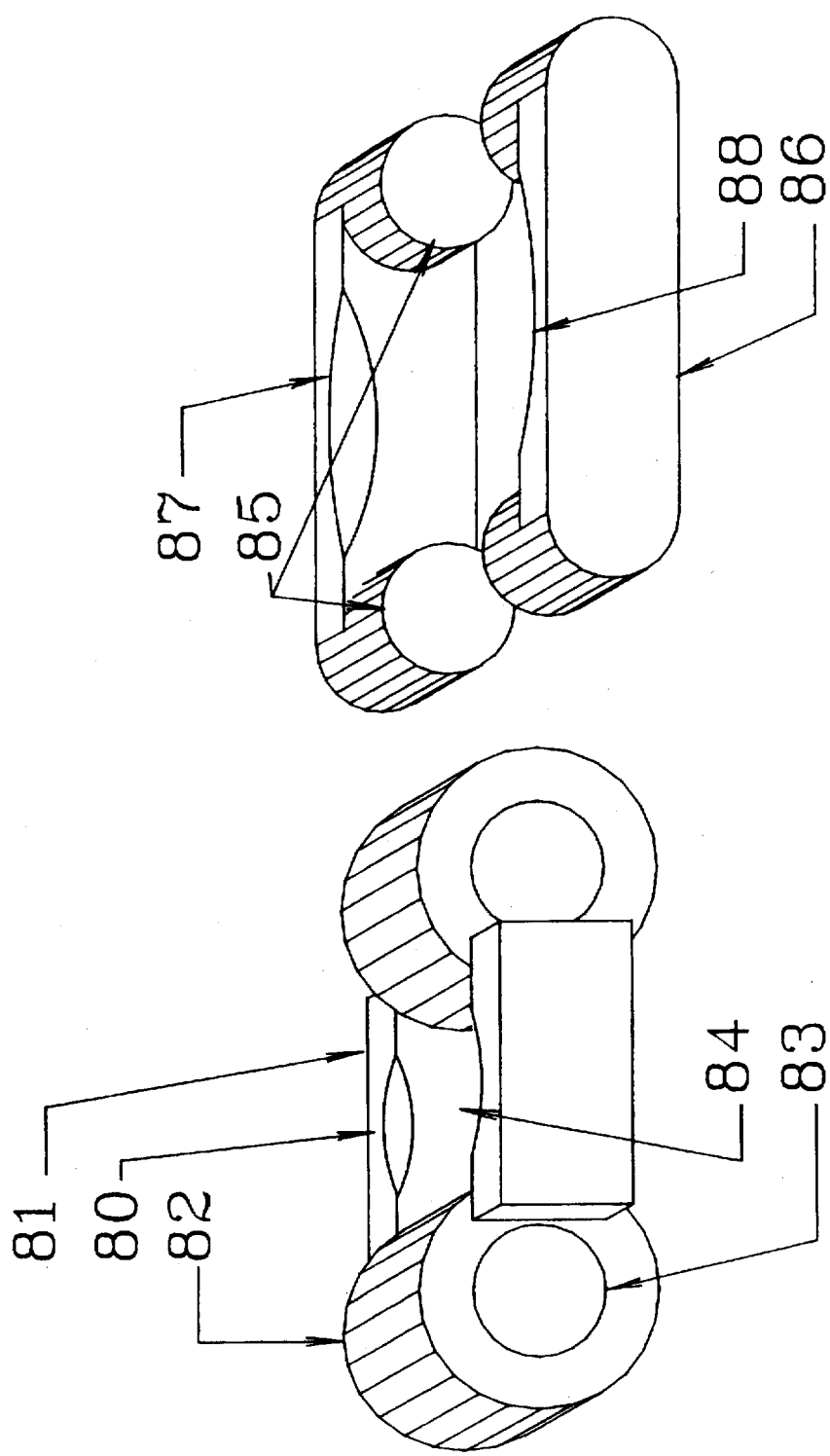

FIG. 26
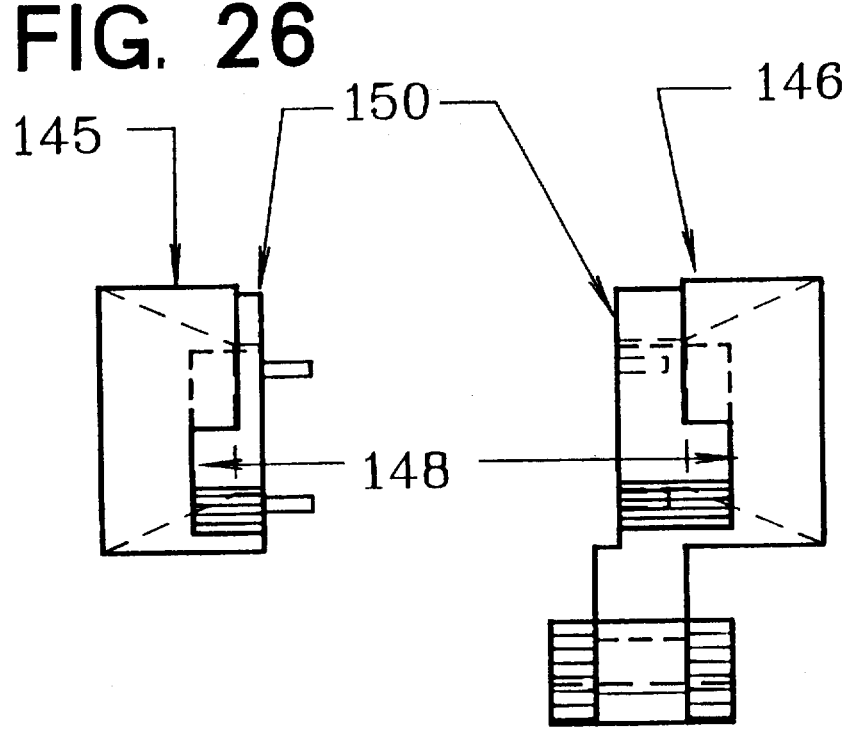
(UNASSEMBLED)
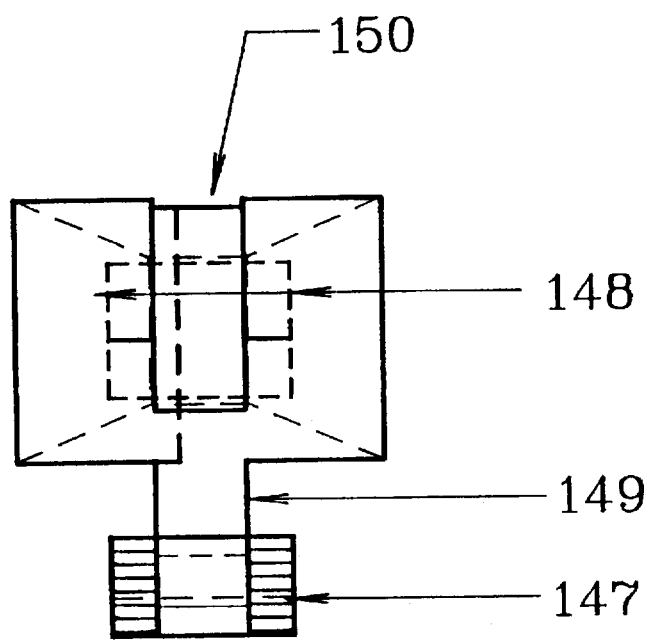
(ASSEMBLED)

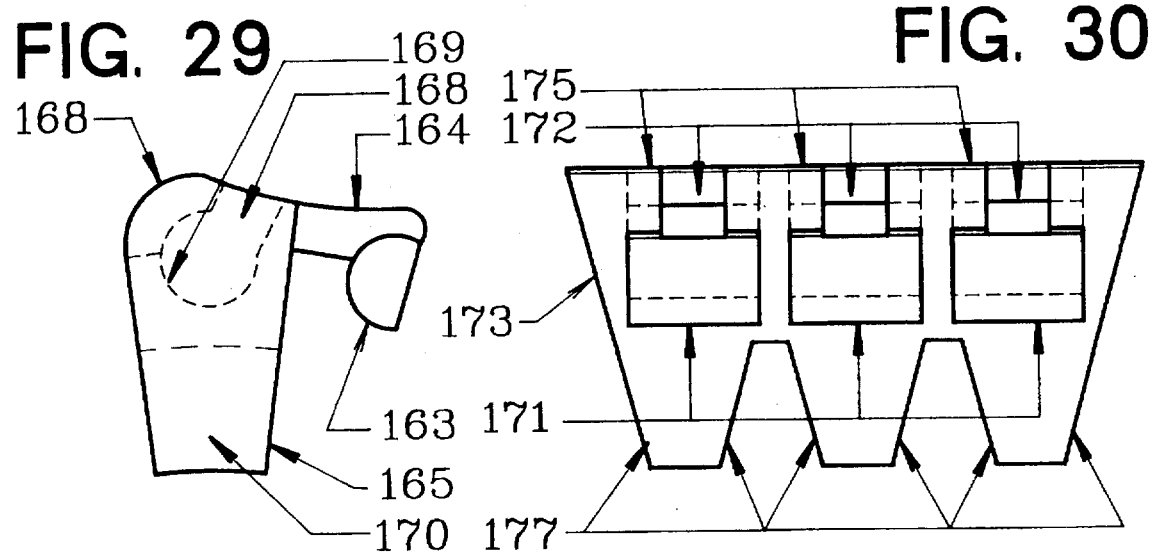
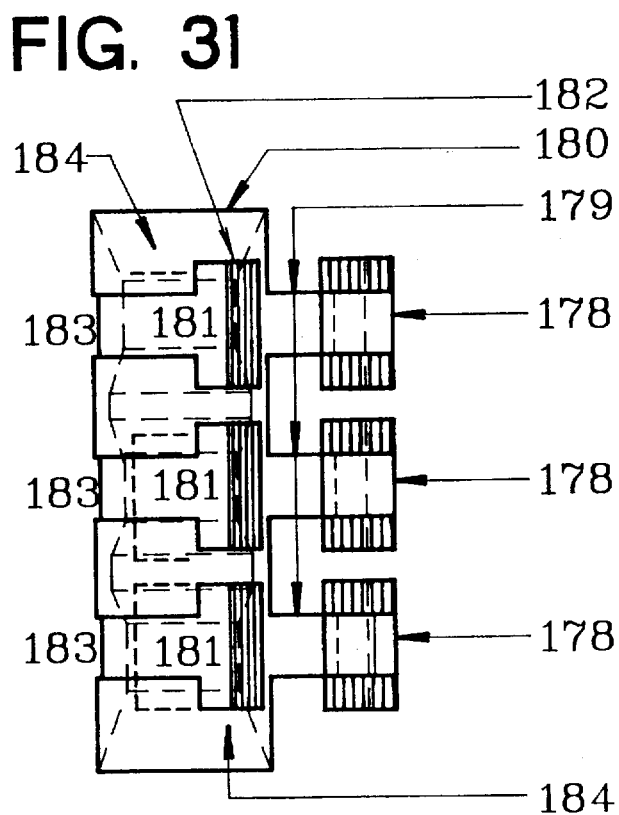

FIG. 32
FIG. 34
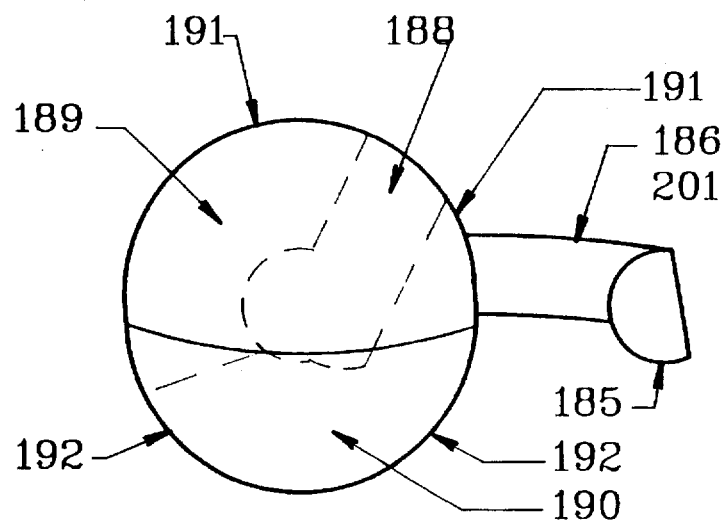
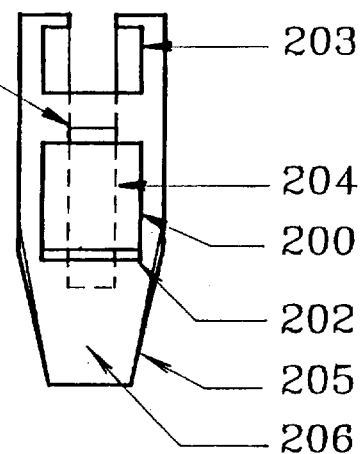
FIG. 33
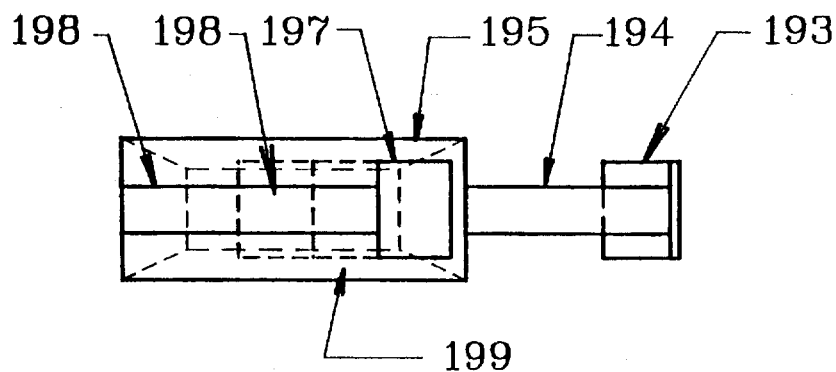

FIG. 46
FIG. 48
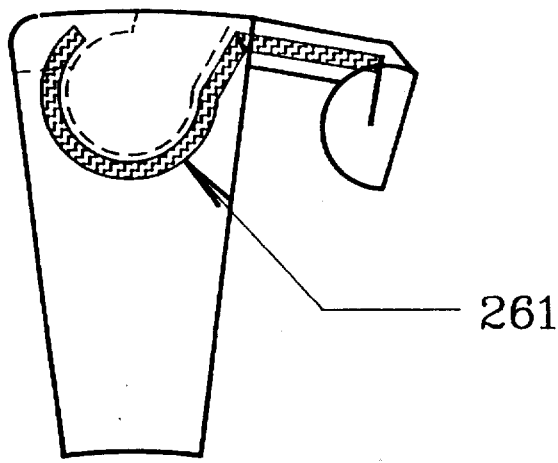
— 261
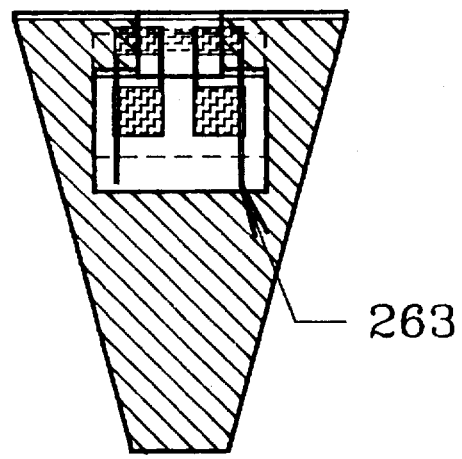
— 263
— 262
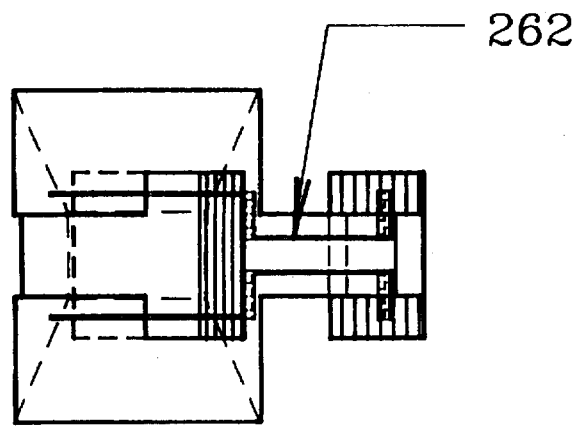
FIG. 47

FIG. 49
FIG. 51
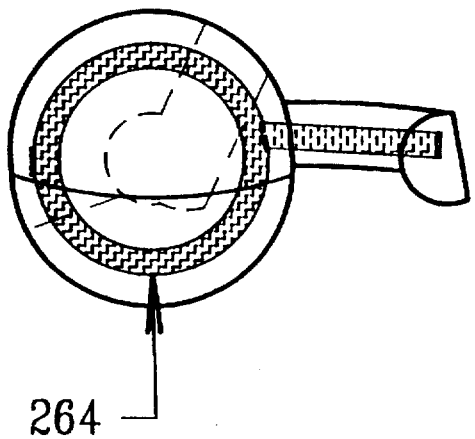
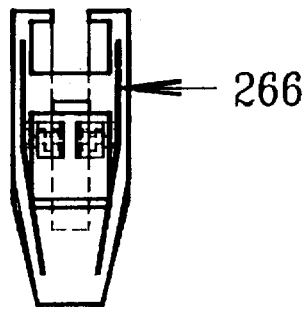
264
266
FIG. 50
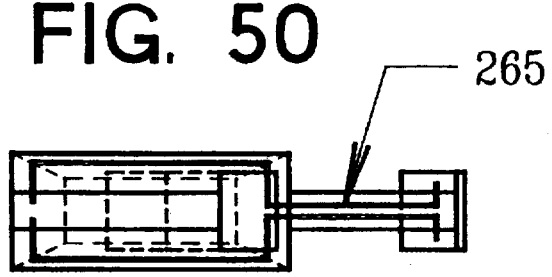
265

5,728,023

PLASTIC CHAIN, MODULE AND SPROCKET CLUSTER

This application is a continuation in part of application Ser. No. 08/281,775, filed Jul. 27, 1994, U.S. Pat. No. 5,520,585. We incorporate herein by reference as fully set forth the application, excluding its claims.

BACKGROUND OF THE INVENTION

1. Field of the Invention

The present invention relates generally to chains, especially those used to transmit torque between sprocket wheels, cog wheels, and pulleys and more particularly to an adjustable segmented chain, having a plurality of substantially similar modular links, or pairs of links, capable of interconnecting to form a closed loop chain, such as is commonly used to transmit pedal or motor generated power to one or more drive axles, wheels, or accessories in bicycles, motorcycles, pedal boats, automobiles, household appliances, and in industrial, military, space, and extreme environment applications. The chain of the present invention may also have applications as a tow chain, as an anchor chain, as a chain for jewelry bracelets and necklaces, for strap handles of suitcases or purses, as clothing belts, etc.

2. Description of Related Art

Belts and chains are commonly used to transmit torque between rotating devices: for example, industrial belts and automotive "fan belts" typically turn and are turned by pulleys connected either to motors or accessory devices; bicycle chains transmit torque between sprocket wheels. In so doing they are subject to dual stresses. Both belts and chains must provide tensile strength to withstand and transmit torque. In addition, belts must flex to travel around pulleys without excessive deformation; and chains must pivot to travel around notched pulleys or sprocket wheels without excessive friction and wear. For many light applications conventional chains are less well suited than belts because of concerns including friction, lubrication, dirt and noise.

As a result of tension and flexion dual stresses, belts wear and break often sooner and more frequently than other machine parts. To replace worn or broken belts one must have or obtain suitable inventory, expend time and labor, and be concerned also about the durability of the replacement belt. The ideal replacement belt (and original belt as well) should fit all or many sizes to minimize inventory stocking requirements. Despite its position within the machinery, the replacement (or original) belt should be capable of installation in minimal time, with minimal effort, and without special tools or tools at all. And it should be long-lived to survive not only the moment's emergency but also the useful life of the machine itself.

Most belts are a continuous loop of fixed length. Such belts vary as to length, requiring many different size belts for different applications. For example, each make and model of automobile is likely to require a different size fan belt or, more typically, belts. To get an auto rolling again following a broken fan, water-pump, alternator, or power-steering belt, auto repair facilities and emergency vehicles therefore must stock—or, at a cost in time, obtain when needed—a large inventory of belts varying in size to replace the variety of worn or broken belts they may encounter. Conventional fixed length replacement belts may last as long as those they replace, but they can be difficult and costly to install. Time and labor to replace a belt can be significant: generally, some part of the machinery to which the belt is connected has to be loosened to provide play for removing/installing the belt, and this part may be difficult to access. The labor factor is aggravated also by the degree of crowding of components which exists under the hoods of most modern automobiles and which may also exist in industrial or other applications where belts need to be replaced or installed.

To address replacement belt inventory and labor issues (which the present invention also does) various inventions have been proposed by others. Several people have suggested that a length of a conventional or modified V-belt be cut down to what is needed for a particular application, loosely installed in position, then the ends fastened together with one or another type of fastener. E.g. U.S. Pat. No. 3,084,408 G. V. Ireland, Dec. 21, 1961; U.S. Pat. No. 3,748,699 B. H. Cunningham, Jul. 31, 1973; U.S. Pat. No. 4,254,666 W. D. Seredick, Mar. 10, 1981; U.S. Pat. No. 4,437,849 W. M. Berg, Mar. 20, 1984; U.S. Pat. No. 4,504,257 A. J. Cennamo, Mar. 12, 1985; U.S. Pat. No. 4,654,020 Scott L. Cramer, Mar. 31, 1987; U.S. Pat. No. 4,846,770 B. J. Lane, Jul. 11, 1989; U.S. Pat. No. 4,979,929 Robert Hynes, Dec. 25, 1990; and a device found at page 33 of the Herrington Valentine '93 catalog, which credits the Hynes patent. Each of these proposed devices, save the Herrington device and one theorized embodiment of the Hynes device, requires tools of some sort for cutting the belt to length and/or for securing the fastener. Each of these without exception is, at best, an emergency solution with temporary lifetime, inferior in performance and durability to a conventional continuous loop belt. Hynes's preferred embodiment and the Herrington device merit discussion here since they alone, of those referred to above, are modular in design, like the present invention. In both cases, however, their modules are of flexible material, vulnerable to wear and breakage by virtue of its very flexibility, particularly where the male and female ends, being thinner than the rest of the modules, are joined, in the Herrington case by several longitudinal pins, and, in the Hynes special case, by a single transverse pin penetrating or made part of the male end and connecting into the "spaced apart projecting ears" of the next module's female end.

The Hynes design would wear and fail more readily than conventional belts for several reasons: (1) because its weak point (at the link pin position) would be smaller and weaker; (2) because the link pin position would flex under tension, rendering it yet more unstable; and (3) because the deformation of the linkage caused by flexing of the belt would expose the design to other failures; for example, as the belt narrowed with stretching and wear, the pin would descend into the V-groove to where it would not fit without tilting so as to disorient and distort the male-female joints of the belt, exaggerating stresses on portions thereof, and possibly abrading the pulley surfaces which in turn would accelerate belt wear.

The Hynes design would wear and fail more readily than the present invention for each of the above reasons and also because of the requirement that it be made of flexible material. The material's required flexibility compromises its tensile strength. The present invention is not so compromised in its choice of a strong material. This distinction assumes importance particularly at the joints between modules, where susceptibility is greatest to failure by breakage. In the integral pin version the Hynes joint requires that the spaced ears of the female end be flexible to permit assembly by hand; such flexibility can also hasten the joint's disassembly in use. In Hynes's metal pin version the joint is likewise weakened because the surrounding material is both bisected and diminished in volume by the pin. By contrast, the joint in the present invention is not weakened by flexibility nor by holes nor by being penetrated or pulled along by foreign and harder substances.

The Herrington design claims only limited durability, doubtless for reasons similar to those described above in relation to Hynes's design, including its manufacture of flexible material and its relative weakness at the points where links are joined.

The present invention is superior for many automotive and industrial applications not only to Hynes's and the Herrington belt but to all belts of flexible material by virtue of its "chain" style design, utilizing as it does, or may, rigid material. Flexible belts must compromise tensile strength against the requirement of flexibility. Chain modules do not (or need not) flex and thus can be built to maximize tensile strength. However, chain modules must somehow deal with friction in order that one chain link or module pivot relative to another.

Chains are commonly used to transmit torque between rotating devices: for example, bicycle chains transmit torque between sprocket wheels. Conventional bicycle chains, as have been used for one hundred years, consist of a closed oval or circular loop made of a plurality of multi-part metal modules or links, narrow links alternating and hinged together with wide ones, each link being fitted at its interior to receive the teeth of sprocket wheels, and each link interleaving end-to-end with its adjoining neighbor, joined together by a shared metal pin set perpendicular to the length of the joined links and which pin acts as a fulcrum or axle allowing pivoting between each of the chain's pairs of links to occur substantially in one single plane around that axle. The chains for bicycles which use a derailleur shifting arrangement must allow adjoining links to pivot two directions to accommodate primary and reverse curves (around the derailleur) in one plane; also, for the chain to be derailed from one sprocket wheel to another in the same concentric cluster, a certain small amount of lateral slip or pivot is allowed to occur at the pivoting connection between chain links.

Chains must provide tensile strength to withstand and transmit torque. The perpendicular structure of each link which meshes with the teeth of sprocket wheels must provide both impact and tensile strength. In addition, chain links must pivot with respect to one another to permit the chain to conform and bend either direction in one plane around sprocket wheels without excessive friction and wear. To provide the required strength, conventional chains are made of metal. To permit pivoting, the links of conventional chains are hinged with and connected by metal pins which function as axles, relative to which are attached and turn the two separated side pieces of one module before and those of another behind.

Like the spacing of their sidewalls, conventional chain links are alternatively wide and narrow. The pin is riveted or splayed at each end to sandwich, and prevent the escape of various skewered metal parts: e.g. a more widely spaced side piece from the left module but which extends some distance above, below and beyond the pin connection; then, rubbing against it, a side piece from the right module and its extension; then a wide washer; then the other side piece from the right module, including its extensions; then the other side piece from the (more wide-sided) left module, including extensions; then the rivet or splayed other end of the pin. The spacing "washer" at the middle of each such pin sandwich holds the left and right sidewalls of each module separate from each other to permit entry of sprocket teeth but allows friction to occur between the two left sides of adjoining modules and the two corresponding right sides. There is friction also between the washer ends and the module side walls which touch it, and between the pin and all the components it penetrates. By its bulk this washer also protects the modules' interconnecting metal hinge pins from the wear they would experience if they were struck repeatedly and directly by the teeth as sprocket wheel and chain engaged or if the pedal or motor power applied between sprocket tooth and chain were carried directly by and to the narrow pin in contact with the working edges of sprocket wheel teeth across the direction of their work. Lubricants such as oil typically are used to reduce friction at the points where module side walls and washers turn against one another, the teeth, and pins.

Conventional chain designs, as described above and in common use to transmit power to bicycle drive wheels, have changed little for decades. U.S. Pat. No. 1,130,582 J. M. Dodge, Mar. 2, 1915, is not fundamentally different from the more recent patents reviewed, which reflect mere modifications and improvements. For example, U.S. Pat. No. 4,596,539 K. Yamasaki, May 7, 1985, to facilitate the chain being derailed from one sprocket wheel to another, introduces cutouts or hollows on the inward-facing marginal edges of the wider links. U.S. Pat. No. 4,960,403 M. Nagano, Jul. 28, 1989, proposes deforming the metal of the wider links outward to accomplish the same purpose. U.S. Pat. No. 5,226,857 T. Ono, May 13, 1992, blends the improvements of the Yamasaki and Nagano patents and asserts that the metal deformation and hollowing need occur on one side of the chain only, since the shifting problem noted is significant primarily when the chain goes from a smaller to a larger sprocket wheel (and not vice versa) and since a bicycle's rear sprocket cluster typically has more narrowly spaced and more stages than does its front sprocket cluster.

U.S. Pat. No. 5,288,278 M. Nagano, Dec. 30, 1991, modifies the standard bicycle chain link by adding a flexion limiting device intended to prevent chain tangling during bumpy mountain bike rides. This patent too is limited to conventional chains which employ alternating narrower and wider links rotatably coupled by pins.

All of the conventional chains reviewed tend to be made of steel or other metal. They tend not to slip against the wheels they turn, as belts may against smooth pulleys, because they make a strong mechanical connection, link against sprocket, perpendicular to the direction of chain movement. However, chains so designed have several drawbacks, the relative importance of which in the bicycle application are roughly as follows: (1) they are relative heavy; (2) they rust; (3) they consist of multiple parts; (4) they are complex to manufacture, (5) they present much surface area to dirt and contamination; (6) they require repeated applications of messy, dirt-collecting oil for lubrication; (7) they are hindered by friction between links during rotation; (8) they wear out and/or stretch; (9) they are noisy; and (10) they can be difficult to install and replace.

As a result of the foregoing drawbacks, conventional chains tend to be used only in applications where power transmission is paramount, giving way to belts in other applications. In addition, conventional chains leave something to be desired, at least for certain applications, in other respects. (11) Their high mass and inertia make them somewhat difficult to accelerate and decelerate. (12) They are not particularly aerodynamic. (13) They are wider than is strictly functional, due to their alternatingly wide and narrow sidewalls. (14) They require a specially designed link pin where breakage, if any, tends to occur. (15) Like a baseball bat they are inflexible, and thus they cannot store and release power like a golf club. (16) Their length is not easily varied.

The present invention is a different kind of chain, as strong and powerful as needed, yet designed to minimize each of the disfunctionalities associated with conventional type chains. (1) The modules and chain of the present invention are light weight, being formed typically of injection molded plastics, or ferro-plastics, the specific gravities of which may be a fraction (often less than one-sixth) that of their conventional metal counterparts. Sprocket clusters too can be made of lightweight plastic once chains are. This further increases the weight savings. The dimensions of the modules also can be reduced to further reduce weight, if appropriate in terms of the balance of other characteristics desired. In the cycling world, light weight is particularly important for racing and hill climbing applications.

(2) To the extent that it may be made entirely or partly of plastic the present invention does not rust. Rust is a major problem for the chains of many amateur cyclists.

(3) The present design involves many fewer parts than the conventional one. Each standard module is of one piece only (typically consisting of two injection-molded pieces bonded or otherwise joined to one another during assembly). Some, but not all, embodiments also require a second type of module for closing and unclosing the loop, which again may be formed of only two pieces removably connected. (4) Fewer parts should mean simpler manufacturing and assembly processes. (5) Unibody modules present a minimal surface area to dirt and contamination. (6) A number of the plastics which could be used to form, in whole or part, the modules, such as nylon with fiberglass, are or can be considered to be, self-lubricating; thus, the use of oil lubricants can be reduced or eliminated, in turn reducing mess and the adhesion of dirt. Anti-static properties can be given the plastic also to minimize dust and dirt collection, and the rotating joint between modules can itself be shaped so that it will tend to expel contaminants. (7) The present design reduces friction, not only by reducing dirt and contaminants. With the present design, unlike the conventional one, there is little or no friction between the sidewalls of different links when they rotate with respect to one another, nor between sidewalls and the "washer" or other bulk surrounding the pin. Thus a reduced surface area bears friction when the links pivot.

(8) Reducing dirt and friction reduces chain wear. The wear and/or stretch associated with the present invention also will depend on the characteristics of the plastics and additives (e.g. carbon fiber or glass) used, with tradeoffs perhaps necessary at this stage in plastics engineering between strength (impact and/or tensile), on the one hand, and optimal weight and lubricity characteristics, on the other. (9) Plastic links are relatively quiet. (10) The chain of the present invention is relatively simple to install and replace. In a preferred embodiment, it requires the use of no tools to assemble and no tools, or a cutting tool only, to disassemble. It is feasible to replace individual links, not just the entire chain. And it is unnecessary to remove the bicycle's wheels to remove or install the chain.

(11) The chain of the present invention has low mass and inertia. Thus a bicycle using it will be relatively easy to pedal. (12) The links of this chain have smooth, rounded edges and are identical to one another in shape and size, not angular and alternatingly wide and narrow like the conventional chain; hence the chain is aerodynamic, and (13) its overall width may be reduced, if desired, thus permitting more tightly clustered, hence more, sprockets. (14) This chain requires no specially designed, breakage-prone link pin, thus it can be engineered without points more liable to break than the others. (15) The present invention can be made of flexible materials, if desired. In conjunction with oval sprocket wheels or the like, such chain flexibility could be useful to store and release pedal power so as to smooth or otherwise optimize the power curve. (16) The present invention permits ready changes in chain length and tension since the number of links to be used is variable and can be modified from time to time with relative ease.

In its V-belt embodiment, the present invention has advantages over conventional belt alternatives beyond its ease of installation and replacement. All flexible V-belts deform when flexing around a pulley, causing the belt to move in relation to the pulley wall. Since V-belts must maintain adhesion to the pulley wall at their point of greatest deformation, V-belts will tend to wear at these contact areas, or slip if the belt is too loose. And wear will tend to loosen the belt over time due to stretch and/or lower seating in the V-groove. In contrast, the outer surface of the present invention does not deform or move relative to the pulley V-wall after contacting it, and this minimizes wear both of belt/chain and pulley. The chain module's outer surface, therefore, can be patterned for maximum adhesion to a smooth V-groove pulley wall. In applications where the adhesion of belt to a pulley (especially to a smooth pulley) is critical, one approach might be to coat the belt modules with an adhesive second material or make them of two different materials cast, snapped or bonded together: the more adhesive material being positioned to contact the pulley surfaces. Where adhesion/traction is especially crucial, the pulley itself can and will be notched or sprocketed to "catch," then release on rotation, fittingly shaped chain modules, in which case the present invention will be readily recognized as a chain, and its adhesive/tractive capabilities will equal those of conventionally designed chains. In such cases, V-shaped pulley grooves would become optional for tractive purposes but might remain useful for other purposes, as for facilitating gear changes via lateral chain movement in conjunction with devices such as bicycle derailleurs. In any event, the present invention's design is such that comparatively little tension need be placed on it to prevent it from slipping relative to pulley, whether smooth or notched or sprocketed. Such relatively light tension results in relatively little wear on pulley bearings and throughout the system.

The height (and depth within the V-groove of a pulley) of all flexible V-belts is limited by the belt's need to flex without excessive deformation when curving around a pulley. Consequently, all flexible V-belts are shaped in cross-section like short, truncated wedges. In contrast, the present invention is a chain the individual links of which do not need to flex and can therefore be shaped like taller truncated wedges extending more deeply into the V-groove, or otherwise shaped to fit notches placed in the pulleys' grooves. This permitted depth within the V-groove, or alternative notch-sprocket connection, gives the present invention improved opportunity for adhesion. This in turn may allow the present invention to operate under less tension than can flexible belts within V grooves. Thus, at optimum, the present invention's tension can be adjusted by hand by adding or removing individual links, without the need for tools. In smooth pulley applications, links which fit together may be provided in more than one length, if desired, to improve adjustability as to overall belt or chain length.

OBJECTS

An object of this invention is to provide an improved bicycle chain which will work on existing conventional bicycles in replacement of a conventional bicycle chain.

Another object of this invention is to provide an improved racing bicycle chain which will work on existing racing bicycles in replacement of existing racing bicycle chains.

Another object of this invention is to provide an improved mountain bicycle chain which will work on existing mountain bicycles in replacement of existing mountain bicycle chains.

Another object of this invention is to provide a light weight bicycle chain, optimally lighter than existing alternatives.

Another object of this invention is to provide a bicycle chain not susceptible to rust.

Another object of this invention is to provide a bicycle chain with relatively few parts.

Another object of this invention is to provide a bicycle chain which is simple to manufacture.

Another object of this invention is to provide a bicycle chain which stays relatively free of dirt and dust contamination.

Another object of this invention is to provide a bicycle chain which requires little or no oil lubrication and thus tends to remain, and to keep its rider and those who service it, clean of messy oil and dirt associated with oil.

Another object of this invention is to provide a bicycle chain the links of which pivot with respect to one another with relatively little friction.

Another object of this invention is to provide a bicycle chain the longevity of which compares favorably to existing alternatives.

Another object of this invention is to provide a bicycle chain which can be built narrower than existing alternatives.

Another object of this invention is to provide a bicycle capable of achieving more, and more subtle, gear changes, as permitted because a narrower chain means that the bicycle's concentric sprocket wheels can be spaced more closely together than is possible given today's relatively unnarrowable multi-part metal bicycle chains.

Another object of this invention is to provide a bicycle chain which is relatively quiet in operation.

Another object of this invention is to provide a bicycle chain which is relatively easy to install and replace.

Another object of this invention is to provide a bicycle chain which has low mass and inertia and is thus relatively easy to pedal and disinclined to tangle regardless of bumpy terrain.

Another object of this invention is to provide a bicycle chain which has improved aerodynamic characteristics.

Another object of this invention is to provide a bicycle chain which requires no specially designed, breakage-prone link pin.

Another object of this invention is to provide a bicycle chain, the links of which can themselves be flexible to store and release pedal power should this be desired to optimize the pedal power curve in certain applications, for example, in conjunction with oval sprocket wheels.

Another object of this invention is to provide a bicycle chain, the length and tension of which may be modified from time to time with relative ease.

An object of this invention is to provide an improved motorcycle chain which will work on existing conventional motorcycles in replacement of a conventional motorcycle chain.

Another object of this invention is to provide a light weight motorcycle chain, optimally lighter than existing alternatives.

Another object of this invention is to provide a motorcycle chain not susceptible to rust.

Another object of this invention is to provide a motorcycle chain with relatively few parts.

Another object of this invention is to provide a motorcycle chain which is simple to manufacture.

Another object of this invention is to provide a motorcycle chain which stays relatively free of dirt and dust contamination.

Another object of this invention is to provide a motorcycle chain which requires little or no oil lubrication and thus tends to remain, and to keep its rider and those who service it, clean of messy oil and dirt associated with oil.

Another object of this invention is to provide a motorcycle chain the links of which pivot with respect to one another with relatively little friction.

Another object of this invention is to provide a motorcycle chain and sprocket system the longevity of which compares favorably to existing alternatives.

Another object of this invention is to provide a motorcycle chain which is relatively quiet in operation.

Another object of this invention is to provide a motorcycle chain which is relatively easy to install and replace.

Another object of this invention is to provide a motorcycle chain which has low mass and inertia.

Another object of this invention is to provide a motorcycle chain which has improved aerodynamic characteristics.

Another object of this invention is to provide a motorcycle chain which requires no specially designed, breakage-prone link pin.

Another object of this invention is to provide a motorcycle chain, the links of which can themselves be flexible should this be desired to optimize the pedal power curve in certain applications, for example, in conjunction with oval sprocket wheels.

Another object of this invention is to provide a motorcycle chain, the length and tension of which may be modified from time to time with relative ease.

Another object is to provide an improved endless type chain with superior durability and useful life due to superior design, the advantages of which include: strength, uniformity, and range of choices of component material; the maximal and equal sizing of all stress-bearing parts of each module so as to avoid weak points; and the confinement movement between surfaces to chain pivot points designed for minimum friction, thereby minimizing deformity, wear and need for lubricants.

Another object is to provide an endless type chain of linked rigid segments of such material and so joined that the joints are, or can be, self-lubricating without need of dirt-collecting oil.

Another object is to provide an endless type chain of linked rigid segments which may be antistatically treated so that it and they tend to remain dirt-free and relatively free of dirt-induced friction.

Another object is to provide an endless chain of linked rigid segments which are so joined that the areas where friction occurs at the pivot points between links is relatively enclosed and isolated from contaminating and friction-causing dust and dirt.

Another object is to provide an endless chain of linked rigid segments which are so joined that centrifugal and other mechanical forces would tend to expel friction-causing dust and dirt from the pivot points between links.

Another object is to provide an endless chain of linked rigid segments which can be simply and inexpensively manufactured, because each of its modules consists of one piece only, such modules also being typically all identical, or of two types only, and capable of being snapped, locked, glued, ultrasonically bonded, or otherwise bonded together.

Another object is to provide an endless chain of linked rigid segments which do not rust.

Another object is to provide an endless chain of linked rigid segments of relatively light-weight material.

Another object is to provide a bicycle or motorcycle chain in color or colors, including varied and vivid colors and rearrangeable patterns of color to appeal to different classes of consumers, to allow differentiation in marketing, and to allow consumers to artistically personalize their own chains.

Another object is to provide a bicycle or motorcycle or other chain in a variety of materials, including materials with varying tensile strengths, impact strengths, hardness, flexibility, lubricity, temperature tolerances, and ultraviolet tolerances to appeal to different classes of consumers and uses and to allow differentation in marketing.

Another object of this invention is to provide a bicycle or motorcycle chain which appeals to persons who commute to school or work in good clothing and want to stay clean of messy oil and dirt associated with oil.

Another object is to provide an endless chain of linked rigid segments with a minimum of moving parts, as each of its modules consists of one part only (or two joined parts only), and movement occurring between such parts is concentrated at a relatively frictionless area.

Another object of this invention is to provide an endless chain of linked segments which has has low mass and inertia and is thus relatively easy to power.

Another object of this invention is to provide an endless chain of linked segments which has low mass and inertia and is thus unlikely to become tangled in use.

Another object of this invention is to provide an endless chain of linked segments which has improved aerodynamic characteristics.

Another object of this invention is to provide an endless chain of linked segments which requires no specially designed, breakage-prone link pin.

Another object of this invention is to provide a chain, the links of which can themselves be flexible to store and release power should this be desired.

Another object of this invention is to provide an endless chain of linked segments, the length and tension of which may be modified from time to time with relative ease.

Another object is to provide a high performance racing bicycle chain which is extra light-weight, requires little or no oil, cleans up easily, does not rust, and which may be utilized with existing racing bicycles without necessarily making adaptations to other parts of the bicycle.

Another object is to provide a chain for mountain bicycles which is extra light-weight, requires little or no oil, cleans up easily, does not rust, and which may be utilized with existing mountain bicycles without necessarily making adaptations to other parts of the bicycle.

Another object is to provide a superior bicycle chain for use with conventional, or similarly styled, bicycle gear sprocket wheels.

Another object is to provide a superior timing-style chain for automotive and other machine timing chain and/or belt applications.

Another object is to provide a superior chain for outer space and other extreme environmental conditions.

Another object is to provide a superior motorcycle chain, modular, oilfree, rustfree, light-weight, durable, easily assembled, easily installed, easily tensioned, and easily changed.

Another object of this invention is to reduce wear to and improve the longevity of bicycle sprocket wheels by minimizing damage done to their teeth by metal chains, especially by metal chains which have become stretched by use.

Another object is to save additional bicycle weight by providing a light weight plastic bicycle sprocket wheel, and cluster of such sprocket wheels, and derailleur gears, to work with the light weight plastic bicycle chain.

Another object is to improve bicycle gear shifting performance and versatility by adding more concentric sprocket wheels closer together within clusters as permitted because the chain's design permits a narrow chain, hence closely spaced sprocket wheels.

Another object is to save additional motorcycle weight by providing a light weight plastic motorcycle sprocket wheel to work with the light weight plastic motorcycle chain.

Another object of this invention is to provide a colorful plastic jewelry chain.

Another object of this invention is to provide an improved endless type belt or chain formed of a plurality of similarly constructed link members that can be readily coupled together to form an endless belt or chain of any predetermined length.

Another object is to provide a modular belt or chain system to meet many diverse needs with a minimum inventory and a minimum number of different parts kept in inventory.

Another object is to provide an improved endless type belt or chain which can be readily installed or replaced without the inconveniences and extra labor often associated with installation or replacement of non-modular belt or chain systems (e.g. having to disassemble, remove or loosen pulleys, wheels, other belts, engines, or other parts to which the belts or chains may neighbor or attach).

Another object is to provide an improved endless type belt or chain which can be readily installed without the use or need of any tools, or special tools.

Another object of this invention is to provide an improved endless type belt or chain formed of a plurality of similarly constructed link members some of which links may come pre-assembled—with or without design changes—to reduce the possibility of unintended disassembly, to facilitate assembly in the field, to facilitate manufacture, to better shelter the mechanical joints between links, and/or to achieve other purposes.

Another object is to provide an improved endless type belt or chain with superior durability and useful life due to superior design, the advantages of which include: strength, rigidity, and uniformity of component material; the maximal and equal sizing of all stress-bearing parts of each module so as to avoid weak points; and the confinement of flex and movement between surfaces to chain pivot points designed for minimum friction, thereby minimizing flex, deformity, wear and need for lubricants.

Another object is to provide an endless belt or chain capable of contacting deeper into and over a larger surface area of the V-groove of a pulley than do or can conventional belts, thus providing improved adhesion of the belt to the pulley, permitting operation under reduced tension, and further reducing pulley and belt wear.

Another object is to provide a means for retro-fitting and improving the adhesive capabilities of existing V-groove pulley systems where desired, converting them to operate as notched groove pulley systems.

Another object is to provide an endless belt or chain the length of which can be adjusted readily with simple or no tools to regulate the length thereof within given limits.

Another object is to provide an endless belt or chain the length of which can be adjusted readily with simple or no tools to regulate the amount of play therein within given limits.

Another object is to provide an endless belt or chain the effectiveness of which over time is less susceptible to environmental damage (e.g. as from the effects of oil and/or heat) than are its competitors, an object the invention may be able to achieve since the material of which its modules are made need not be flexible nor utilize oil lubricants.

Another object is to provide an endless belt or chain of linked rigid segments of such material and so joined that the joints are, or can be, self-lubricating without need of dirt-collecting oil.

Another object is to provide an endless belt or chain of linked rigid segments so joined that in motion the joints by virtue of centrifugal force are self-cleaning.

Another object is to provide an endless belt or chain of linked rigid segments which can be simply and inexpensively manufactured, because each of its modules consists of one piece only, such modules also being typically all identical, and capable of being snapped together.

Another object is to provide an endless belt or chain of linked rigid segments which can be simply and inexpensively assembled because each of its modules consists of one piece only, such modules also being typically all identical, and capable of being snapped together.

Another object is to provide an endless belt or chain of linked rigid segments which can be simply and inexpensively installed (originally or as replacement) because it is modular and each of its modules consists of one piece only, such modules also being typically all identical, and capable of being snapped together.

Another object is to provide an endless belt or chain of linked rigid segments which do not rust.

Another object is to provide an endless belt or chain of linked rigid segments of relatively light-weight material.

Another object is to provide an endless belt or chain of linked rigid segments with a minimum of moving parts, as each of its modules consists of one part only, and movement occurring between such parts is concentrated at a relatively frictionless area.

Another object of this invention is to provide an endless type chain which can be conveniently closed into a loop and reopened again for removal and replacement.

Another object of this invention is to provide an endless type chain which for many applications is superior in performance and durability to alternative products presently available.

SUMMARY OF THE INVENTION

The chain of this invention is constructed of plastic, metal, or plastic-coated metal modules connected in end to end relationship. It is conceived for use as a drive chain primarily. It is claimed also for jewelry applications. Each individual module is without moving parts. In one set of embodiments, each module and has a cavity between its front and rear ends for receiving a tooth of a sprocket wheel. In another set of embodiments, each is shaped to fit a V-groove or a notched pulley. Each pair of adjacent modules has a transverse pin or pins extending from one module into a transverse pin-receiving socket or sockets of the other module so as to form a rotatable joint between the modules. Various means of constructing and joining the modules are disclosed.

In a preferred embodiment, the present invention comprises a series of end-to-end inter-connectable, essentially identical modules for constructing a chain for use with sprocket wheels, as on various types of bicycles and motorcycles, or with V-groove or notched pulleys, as for fan belts or timing gears. In a majority of the embodiments shown, each module is made of two or more pieces joined together, generally herein to be called "halves," although they may be unequal in size. When the halves are joined together, they capture in their "socket" end the pin of an adjoining module. In other embodiments, the module may be of unitary construction. In such cases, there is a gated or angled channel to its socket, or other means, by which the neighboring module's pin may enter but not inadvertently exit. Several such means are described below.

The sprocket wheel cluster which the plastic or plastic-coated chain permits consists of stair-stepped multiple concentric rings of teeth each of which can be wider than a conventional bicycle chain now allows and which together can support each other by means of a common infrastructure. The chain and cluster are light-weight and non-rusting; they can be also self-lubricating and colorful.

Each module, whether unitary or completed by combining halves, forms a single body portion with no moving parts and which may be substantially rigid or to some extent flexible. The body portion of each module has two opposed interconnecting ends, and it is in the direction of one (or either) of these ends that the modules travel. In the preferred embodiment, one end of each module, which typically will be the front end, is female and contains one or more symmetrically rotatable (e.g. conical or cylindrical) "sockets" or cavities which is or are oriented transversely to the module's front-rear axis. At the opposing, typically rear or trailing, end of each module is a male end which consists of one or more solid cylinders or other such rotatably symmetrical masses ("pins" in the terminology to be used) whose diameter is slightly smaller than is the diameter of the corresponding position of the female end's socket, and such pin or pins likewise is or are oriented sideways in the same plane as the female end's socket.

In another preferred, "double-male, double-female," embodiment, there are alternating modules of two types. Half the modules are "double females" and have sideways female "sockets" at both their leading and trailing ends. The alternating "double male" modules in this embodiment have sideways male "pins" at both their fronts and rears. There is no need that both types of modules be non-unitary. For example, if the "double female" type of module is assembled from two (e.g. upper and lower) pieces, the neighboring "double male" module can be formed of a single piece. Similarly, if the "double male" modules are assembled from two (e.g. left and right) pieces, then the neighboring "double female" modules can be of unitary construction. If gated channels are used, neither type of modules need be assembled from two pieces.

To fashion a chain of "combined halves" modules one assembles the two or more pieces of each divided module by snapping, locking, gluing, bonding, or otherwise assembling them together so that the female end of one assembled module embraces the assembled male end of its neighbor, allowing it perhaps 90 or more degrees of rotation (45 degrees in either direction from straight) in the plane of the hinge so formed. This process is continued until a suitable length chain has been created, then the ends are looped back to become neighbors, and then they are joined together in the same manner. The two-piece modules can be assembled removeably or permanently, though it may be desirable (and necessary in some applications) that at least one module per closed loop chain be assembled in place or non-permanently for ease of installation and removal. The structure of the end-to-end joint so formed between neighboring modules permits rotation between modules in one plane to accommodate the chain's curving travel around sprocket wheels, including travel around reverse curves. In derailleur application, enough lateral slack can be built into this joint to permit the modular chain to be shifted from one sprocket wheel to another parallel sprocket wheel in the same cluster.

There are various patterns into which the identical-looking finished "male-female" modules can be halved or otherwise divided which will permit their pieces to be so rejoined: e.g. (1) upper and lower true halves; (2) upper-rear (or front) one-quarters and other-three-quarter pieces; (3) right and left halves; (4) right-front (or rear) one-quarters and other-three-quarter pieces; (5) top to bottom across female end bisecting the socket lengthwise; (6) right-left split female ends with upper-lower split male ends; etc. Note is made here that throughout this application the term "half," whether used as a noun or a verb, is to be interpreted to include not only identical halves but also pairs of parts, or the creation of pairs of parts, which are non-identical, asymmetrical, and/or unequal in size. Patterns (1) and (3) will work also for "double female" and "double male" modules. Not all of these methods of dividing the module will work for the perhaps special "loop-closer" module needed to close the two ends and make a continuous loop of the modular chain. Of the six numbered examples described, (1), (2), (5) and (6) are forms of standard modules which would work also as loop closers. Of these, (5) is perhaps the least strongly connected and most difficult to assemble. Type (6) is a particularly preferred embodiment since the two halves of each module can be held together by a lock and key design, rather than by glue or bonding, and this permits them to be readily assembled and disassembled.

So that the modular chain can turn and be turned by a sprocket wheel there must be, at or near the center of each module's body, a vertical cavity shaped to receive then release a single tooth of a revolving sprocket wheel. Some curve or scoop to the front, back and sides of this cavity opening may be desirable to facilitate reception and release of a sprocket wheel tooth, particularly during shifting or when the teeth are tapered. The vertical cavity should go all the way through the module's body, top to bottom, or there should be both a top and a bottom indentation type of cavity, in applications where, as with typical derailleur-fitted bicycles, the chain must travel reverse curves. The vertical cavity should receive the tooth deeply, and its walls should be steep at least part of the way down, so that the tooth's work edge and the cavity wall make a strong contact perpendicular to the sprocket wheel's radius, the better to transmit torque.

So that the modular chain can turn and be turned by a pulley there must be, at or near the center of each module's body, walls fitted to the V-groove or notches of the pulley.

In one preferred embodiment the modules, and half-modules, are each integrally formed of an injection molded metal or a suitable plastic material, such as a nylon-fiberglass or nylon-carbon fiber mix, or other elastomer or acetal plastic (which may contain a metal insert for structural strength). The plastic exterior of the module provides for a very low friction or substantially frictionless rotatable joint between modules. (The tensile strength, impact strength, friction, lubrication, weight, color, and other properties of the modules can be modified and balanced for various applications by the mix of ingredients, additives and/or inserts used.) In a plastic or plastic-coated embodiment, the rotatable joint can be considered to be self lubricating and is positioned internally to the module where it is not apt to become dirty; also, it can be anti-statically treated and shaped to expel dirt.

In another preferred embodiment, the present invention comprises a series of interconnectable modules for constructing a friction-drive belt or chain for use as original equipment or for replacement purposes on smooth and/or notched pulley systems. The term smooth pulleys is used herein and in the claims to differentiate from notched or sprocketed pulleys/belt systems, such as timing belt and pulleys. In addition, reference is made to V-pulleys herein and in the claims, and this should be understood to include belt/pulley systems with a single V or a plurality of side by side V notches for receiving multiple track belts. The term also includes belts which have a guiding track on their back sides, for complex belt paths with serpentine or reverse curves.

In one preferred embodiment a belt or chain module according to the invention includes a substantially rigid body portion, shaped in cross section to conform to the groove or grooves of smooth V-pulleys. The rigid body portion includes connecting means for removably interconnecting the module with other similar modules in end to end joints to form a continuous belt or chain. The structure of the joint permits rotation between modules to accommodate travel around pulleys.

In a preferred form of the invention, the connecting means includes a projection extending generally longitudinally from one end of the body portion, with a transverse cross bar at the end of the projection. A complimentarily shaped cavity is included in the body portion, shaped and positioned and open at the top of the body portion so as to receive a projection of a succeeding module. The projection and cavity include means for locking adjacent modules together against longitudinal force in the belt after the projection has been inserted into the cavity.

In one preferred embodiment the modules are each integrally formed of a suitable plastic material, such as Delrin 500, nylon, or other elastomer or acetal plastic, providing for a very low friction or substantially frictionless rotatable joint between modules. This joint can be considered to be self lubricating and is positioned to utilize centrifugal force to self-clean itself of foreign matter which might get into it.

In another preferred embodiment a belt or chain module according to the invention includes a substantially rigid body portion, shaped in cross section sideways to its direction of travel to conform to the notches of a notched pulley or cluster of notched pulleys. It is preferred that the sidewalls of such notched pulleys in the direction of their travel be angled to form notchy V-grooves, to which the module in cross section also conforms, where the ability to shift gears by shifting the chain laterally from one notched pulley to another is desired, as for a bicycle chain. The rigid body portion of the module includes connecting means for removably interconnecting the module with other similar modules in end to end joints to form a continuous belt. The structure of the joint permits rotation between modules to accommodate travel around pulleys.

BRIEF DESCRIPTION OF THE DRAWINGS

FIG. 17 generally illustrates an angle view of a "double female" type module manufactured in one single piece.

FIG. 18 generally illustrates an angle view of a "double male" type module which is split into right and left halves and is designed for use in alternation with the FIG. 17 type module.

FIG. 26 generally illustrates a top view (unassembled and assembled) of a two-piece V-belt style module consisting of non-symetrical halves which might be bonded together with the cross-bar of one module non-detachably contained, but capable of pivoting, within the body of the adjoining module.

FIG. 29 generally illustrates a variant module of the belt (link of the chain) with a plurality of side by side V shapes (to accomodate a pulley with multiple V notches); it is shown in a preferred embodiment viewed from one side.

FIG. 30 generally illustrates a variant module of the belt (link of the chain) with a plurality of side by side V shapes (to accomodate a pulley with multiple V notches); it is shown in a preferred embodiment viewed from one end. Three side by side V shapes are shown here; more or fewer could be utilized as needed or desired in any particular application.

FIG. 31 generally illustrates a variant module of the belt (link of the chain) with a plurality of side by side V shapes (to accomodate a pulley with multiple V notches); it is shown in a preferred embodiment viewed from above. Three side by side V shapes are shown here; more or fewer could be utilized as needed or desired in any particular application.

FIG. 32 generally illustrates a side view of a single module of the belt (link of the chain) in a preferred embodiment where a notched pulley is to be utilized.

FIG. 33 generally illustrates a top view of a FIG. 32 type single module of the belt (link of the chain) in a preferred embodiment where a notched pulley is to be utilized.

FIG. 34 generally illustrates an end view of a FIG. 32 type module in a preferred embodiment where a notched pulley is to be utilized.

FIGS. 43-52 are metal insert versions of some of the foregoing.

FIG. 43 generally illustrates one symmetrical half of a single module, or link, of the chain in a preferred FIG. 1 type embodiment viewed from above, with metal inside plastic.

FIG. 44 generally illustrates one symmetrical half of a single module, or link, of the chain in a preferred FIG. 1 type embodiment viewed from the side, with metal inside plastic.

FIG. 45 generally illustrates one symmetrical half of a single module, or link, of the chain in a preferred FIG. 1 type embodiment viewed from the female end, with metal inside plastic.

FIG. 46 generally illustrates a single module of the belt (link of the chain) in a preferred V-belt style embodiment viewed from one side, with metal inside plastic.

FIG. 47 generally illustrates a single module of the belt (link of the chain) in a preferred V-belt style embodiment viewed from above, with metal inside plastic.

FIG. 48 generally illustrates a single module of the belt (link of the chain) in a preferred V-belt style embodiment viewed from one end, with metal inside plastic.

FIG. 49 generally illustrates a side view of a single module of the belt (link of the chain) in a preferred embodiment where a notched pulley is to be utilized, with metal inside plastic.

FIG. 50 generally illustrates a top view of a FIG. 49 type single module of the belt (link of the chain) in a preferred embodiment where a notched pulley is to be utilized.

FIG. 51 generally illustrates an end view of a FIG. 49 type module in a preferred embodiment where a notched pulley is to be utilized.

FIG. 52 generally illustrates an angle view of a ferro-plastic chain module type designed to connect in a left-right alternating manner, the modules connectable and disconnectable when, and only when, they are at more or less right angles to one another.

DETAILED DESCRIPTION OF THE PREFERRED EMBODIMENTS

Figure 1:
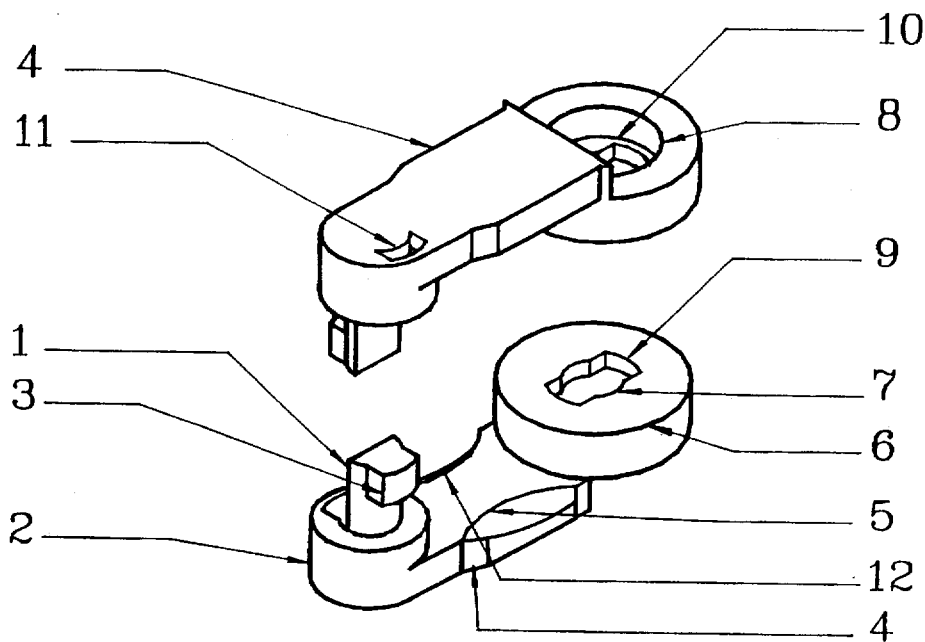
FIG. 1 generally illustrates a perspective view of two separated, and poised to be joined, identical half modules, or links, of the chain in a preferred key-lock, male-female embodiment. The module is divided so that its barrel, or female end, is split into right-left halves. At the same time, its pin, or male, end is a stepped diameter cylinder, the large-diameter ends of which are split left-right as are the barrel-halves and the smaller diameter extremities of which are divided into generally upper-lower halves, each of which is fitted with an outward-facing key at its unattached extremity. The socket of each barrel half is stepped to correspond to the two differing pin diameters. The socket's narrow diameter mid-section is fitted with one or more channels to permit passage of the keys during assembly, at an angle not encountered in normal use. Once the module is assembled (typically in chain fashion), each key fits into a slot provided in the opposing larger diameter pin half.

FIG. 1 generally illustrates a perspective view of two separated, and poised to be joined, identical half modules, or links, of the chain in a preferred key-lock, male-female embodiment. The module is divided so that its barrel, or female end, is split into right-left halves. At the same time, its pin, or male, end is a stepped diameter cylinder, the large-diameter ends of which are split left-right as are the barrel-halves and the smaller diameter extremities of which are divided into generally upper-lower halves, each of which is fitted with an outward-facing key at its unattached extremity. The socket of each barrel half is stepped to correspond to the two differing pin diameters. The socket's narrow diameter mid-section is fitted with one or more channels to permit passage of the keys during assembly, at an angle not encountered in normal use. Once the module is assembled (typically in chain fashion), each key fits into a slot provided in the opposing larger diameter pin half.

Plastic composition permits the module to be lightweight, integrally molded for strength and simplicity, and, to some degree, self-lubricating. Rigidity, or at least the ability to resume prior dimension after stretching or flexing, is required to the extent that the chain will not permanently stretch and cease to fit the sprocket wheels for which it is designed. Different facets of the module are identified as follows: "1" is the narrow diameter portion of the pin; "2" is the wide diameter portion of the pin; "3" is the key; "4" are the sidewalls; "5" is the scoop in the interior sidewall; "6" is the barrel; "7" is the narrow diameter portion of the socket within the barrel; "8" is the wide diameter portion of the socket within the barrel; "9" is the keyhole; "10" is the lock; "11" is the mold-assist; and "12" is the sprocket-holder.

The module is halved or otherwise divided so that it can be reassembled with another similar module interconnectedly end-to-end, the pin of one module inside the barrel of its neighbor. See FIG. 5.

The pin end, "1/2/3," may be considered the rear of the module, as the chain will perform and wear best if the chain is oriented with this pin end traveling last and horizontal, as it passes over the top of a vertically oriented sprocket wheel.

The bearing surfaces of the pin, "2," and socket, "8," which meet one another must be very smooth to minimize friction and should fit one another loosely enough to permit rotation, tightly enough to prevent undue slack. To achieve such smoothness requires well polished molds and care. The pin must be strong to withstand stress, especially shearing stress (and some twisting stress during gear shifts) where narrow pin "1" joins wider pin "2," where "2" joins the sidewall "4," and where key "3" joins lock "10." Rounded corners and integral formation, as by injection molded plastic, will lend strength to these connecting areas of the module.

The dual diameter pin design shown in this Figure is strong at the pin's sidewall connections because its diameter is greatest there. Also, this pin design will cause the pin to be self-centering within the socket of its neighbor's barrel and thus reduce or eliminate friction between one module's interior sidewall "4" and the exterior wall of the neighboring module's barrel "6". In addition this pin design permits the barrel "6", and the connection between its two halves, to be most massive and strong toward the pin's center, where it takes the greatest beating from and does most of its work against the teeth of sprocket wheels.

The two parallel sidewalls, "4," are integrally formed with and connected strongly at their rear end to the perpendicularly set pin, "½," and at their other end to a larger perpendicular barrel, "6," here shaped like a larger cylinder through which extends a void, or socket, "⅞, " shaped to fit the pin, here like a dual diameter cylinder, thinnest at the center, and set perpendicularly to the sidewalls like the pin which it parallels, and sized to a diameter, along each point of its length, just slightly larger than that of the pin, "½, " which forms the body's other end. The interiors of the parallel sidewalls, "4," are shown bevelled with a scoop, "5," to facilitate the receipt of the sprocket teeth by the sprocket holding cavity, "12," important particularly during lateral gear changes. The width of the sidewalls, "4," can be as narrow (and hence lightweight) as the strength of the plastic used will allow. The sidewalls, "4," must be fashioned narrow enough so that when the chain formed by these modules is in use on one of the smaller sprocket wheels within a cluster its exterior sidewall will not contact and be interfered with by an adjoining larger sprocket wheel.

The barrel, "6," is shown cylindrical in exterior aspect. This shape best accommodates the teeth of most bicycle and motorcycle sprocket wheels, easing the tooth's entrance and holding it secure once well inserted. The exterior walls of the barrel must be of strong material and design to stand up over time against repetitive entry hits from sprocket teeth and to transmit force from sprocket to chain to sprocket. The barrel walls cannot compress unduly under such forces for otherwise they would pinch the pin, "½," contained in the barrel's socket, "⅞," causing an unacceptable amount of friction at the rotating joint between modules.

The pin/socket joint ("½ and ⅜") must rotate with a minimum of friction, optimally assisted by self-lubricating characteristics of the plastics or other materials used and the ultrasmooth surfaces of the parts in contact. These parts must be strong enough to take the stress of pulling action as well as of rotating between modules, especially at their respective beating edges where pressure is applied to their contact when the chain is stretched. Also, the barrel-sidewall ("6-4") connection must be a strong one; that the two are rounded at contact and integrally injection molded lends strength to this stress point, as does the slight bulking up and rounding of the top and bottom cylinder sidewall joint.

The sprocket-holder, "12," is a generally rectangle-shaped socket or void at the center of the module, extending from bottom of the module (through to its top in the embodiment this Figure illustrates) and fitted to receive one tooth at a time of a sprocket wheel. The cylindrical shape of the barrel exterior makes for a generously sized opening and sloping wall at the sprocket-holder's front and rear and helps it to receive and release sprocket teeth. This shape also provides maximum strength at its center, where the work edges of the seated tooth and the barrel's exterior meet each other at the perpendicular when torque is applied and transmitted between sprocket wheels. Even so, since the sprocket teeth typically have rounded corners, the joint between the sidewall and barrel can be strengthened, if desired, by bulking up and rounding the corners of this joint slightly, especially at the otherwise most weakly connected tops and bottoms. In applications where the chain must run through reverse curves, such as with a bicycle derailleur, it is essential that both the top and the bottom of the module have either a separate or a shared sprocket-holder. The rectangular top to bottom hole clear through the module in this Figure is a shared sprocket holder, and will accept sprocket teeth from either sides, working thus for standard and for reverse curves.

In this embodiment, each narrow half-pin, "1," is fitted with an outward-facing key, "3," at or near its unattached extremity. No glue or permanent bonding is required in this embodiment of the invention because the module halves are held together by the keys, "3," rotated keyholes, "9," and locks "10." The socket of each barrel half is stepped to correspond to the two differing pin diameters, and at the narrow mid-section is fitted with one or more keyhole channels "9," to permit passage of the keys during assembly, at an angle not encountered in normal use. Once the module is assembled (at right angles to its neighbor) in chain fashion, one module's socket embracing its neighbor's pin, each key fits into a slot or lock provided in its opposite half's larger diameter pin, and its withdrawal is impeded by "7," the narrow diameter portion of the neighboring module's socket, when the links are positioned in normal use.

Two features shown in this Figure, the two-sided keyhole, "9," and the mold-assist, "11," are inessential to the chain's function but merely facilitate manufacturing economies. A single sided keyhole could also be employed, which would further reduce the remote chance of accidental disassembly, since the two keys could not pass simultaneously. The mold-assist is unnecessary if one is willing to have the module pieces be asymmetrical or to use advanced (and more expensive) molding techniques.

Figure 2:
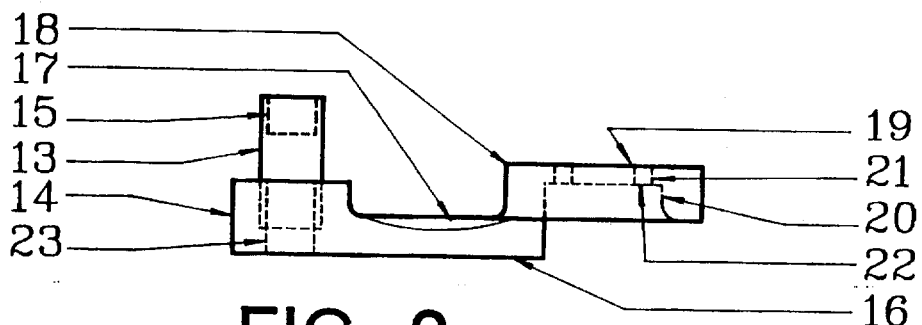
FIG. 2 generally illustrates one symmetrical half of a single module, or link, of the chain in a preferred FIG. 1 type embodiment viewed from above.

FIG. 2 generally illustrates one symmetrical half of a single module, or link, of the chain in a preferred FIG. 1 type embodiment viewed from above. Different facets of the module are identified as follows: "13" is the narrow diameter portion of the pin; "14" is the wide diameter portion of the pin; "15" is the key; "16" are the sidewalls; "17" is the scoop in the interior sidewall; "18" is the barrel; "19" is the narrow diameter portion of the socket within the barrel; 20" is the wide diameter portion of the socket within the barrel; "21" is the keyhole; "22" is the lock; and "23" is the mold-assist.

Figure 3:
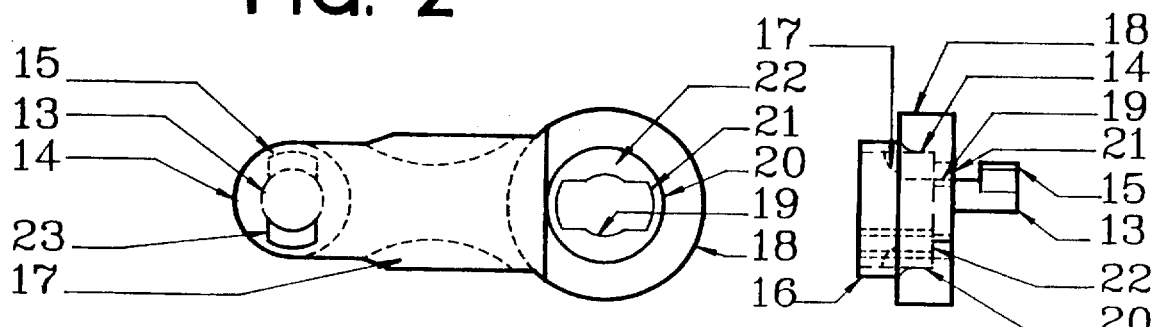
FIG. 3 generally illustrates one symmetrical half of a single module, or link, of the chain in a preferred FIG. 1 type embodiment viewed from the side.

FIG. 3 generally illustrates one symmetrical half of a single module, or link, of the chain in a preferred FIG. 1 type embodiment viewed from the side. Different facets of the module are identified as follows: "13" is the narrow diameter portion of the pin; "14" is the wide diameter portion of the pin; "15" is the key; "16" are the sidewalls; "17" is the scoop in the interior sidewall; "18" is the barrel; "19" is the narrow diameter portion of the socket within the barrel; 20" is the wide diameter portion of the socket within the barrel; "21" is the keyhole; "22" is the lock; and "23" is the mold-assist.

Figure 4:
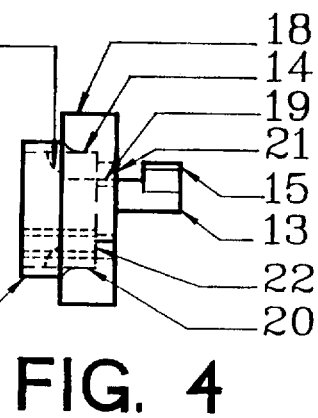
FIG. 4 generally illustrates one symmetrical half of a single module, or link, of the chain in a preferred FIG. 1 type embodiment viewed from the female end.

FIG. 4 generally illustrates one symmetrical half of a single module, or link, of the chain in a preferred FIG. 1 type embodiment viewed from the female end. Different facets of the module are identified as follows: "13" is the narrow diameter portion of the pin; "14" is the wide diameter portion of the pin; "15" is the key; "16" are the sidewalls; "17" is the scoop in the interior sidewall; "18" is the barrel; "19" is the narrow diameter portion of the socket within the barrel; 20" is the wide diameter portion of the socket within the barrel; "21" is the keyhole; "22" is the lock; and "23" is the mold-assist.

Figure 5:
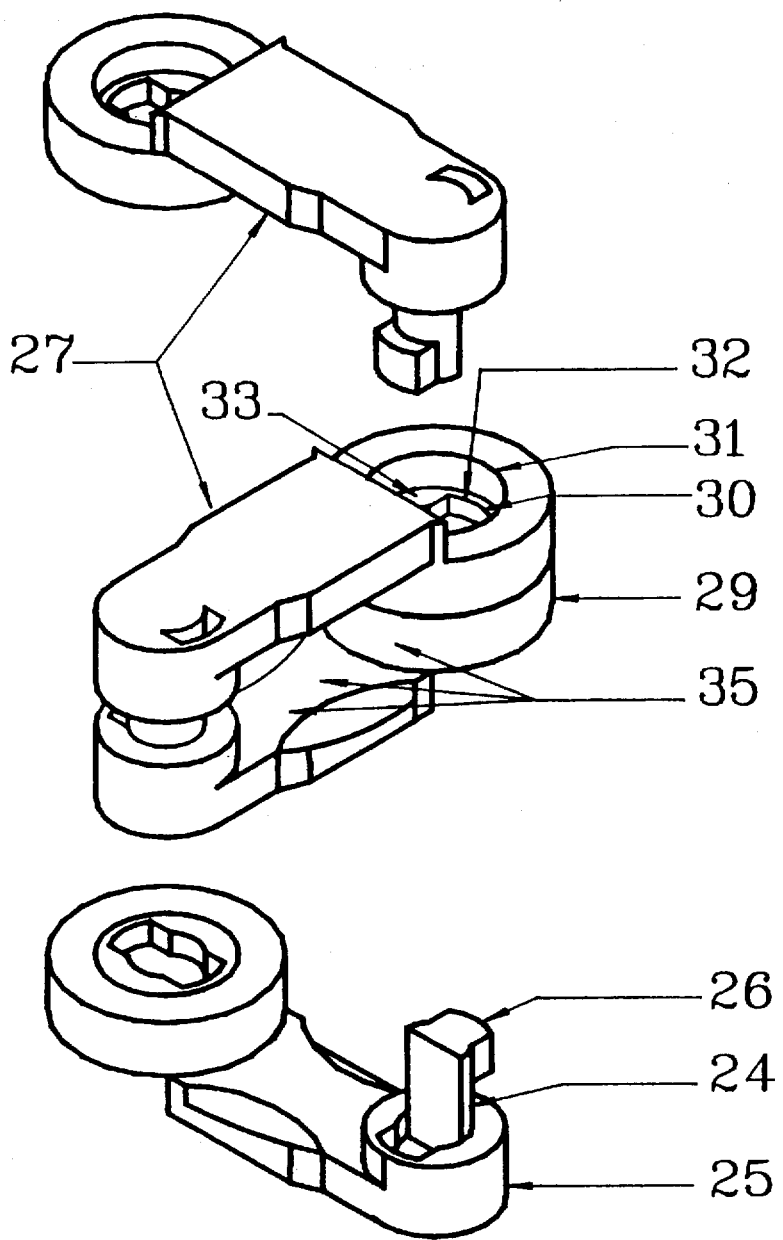
FIG. 5 illustrates from an angle two FIG. 1 type modules of the chain. The two halves of one are pressed together. At right angle assembly position with respect to the first, the second module's two halves are shown as yet separate but poised to be slipped past one another through the key and inside the socket of the first so that the inward planar surfaces of the second module's split cylinder male ends will lie together within and through the two adjoining half-barrels of the first module while the outward-facing keys of the second module's split cylinder male ends will fit into notches provided in the wider-diameter portion of the opposing pin half.

FIG. 5 illustrates from an angle two FIG. 1 type modules of the chain. The two halves of one are pressed together. At right angle assembly position with respect to the fist, the second module's two halves are shown as yet separate but poised to be slipped past one another inside the socket of the first so that the inward planar surfaces of the second module's split cylinder male ends will lie together within and through the two adjoining half-barrels of the first module while the outward-facing keys of the second module's split cylinder male ends will fit into notches provided in the wider-diameter portion of the opposing pin half. Different facets of the module are identified as follows: "24" is the narrow diameter portion of the pin; "25" is the wide diameter portion of the pin; "26" is the key; "27" are the sidewalls; "28" is the scoop in the interior sidewall; "29" is the barrel; "30" is the narrow diameter portion of the socket within the barrel; 31" is the wide diameter portion of the socket within the barrel; "32" is the keyhole; "33" is the lock; "34" is the mold-assist; and "35" is the sprocket holder.

The right angle position is necessary to assemble and to disassemble the modules due to the design of the keyhole and lock mechanism. When the chain is placed in normal use such a position between adjoining links is not attained, thus unintended disassembly is prevented.

Figure 6:
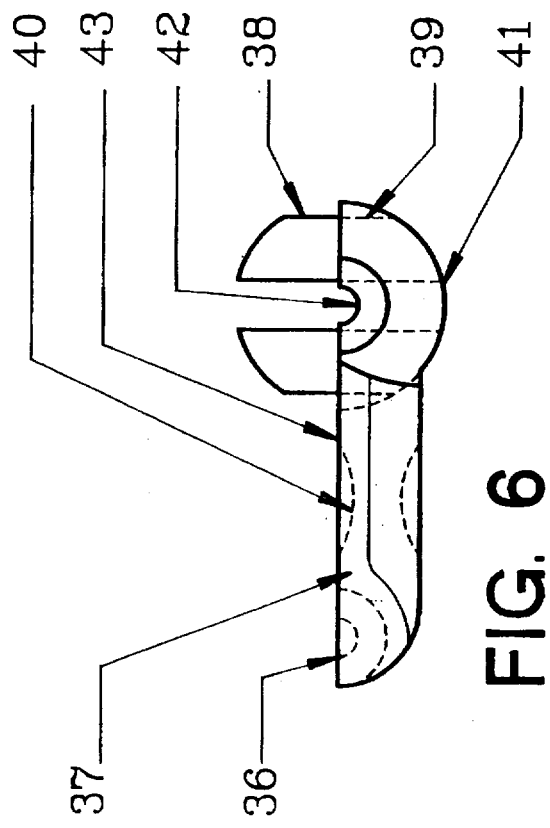
FIG. 6 generally illustrates a single half-module, or link, of the chain in a preferred male-female embodiment viewed from one side where the module is divided into two symmetrical halves, a true upper half and a true lower half, with opposing connectors capable of being snapped, glued or ultrasonically bonded together and where, for illustration, the pin is given a narrow-waisted double truncated cone shape.

FIG. 6 generally illustrates a single half-module, or link, of the chain in a preferred male-female embodiment viewed from one side where the module's division is into two symmetrical halves, a true upper half and a true lower half, with opposing connectors capable of being snapped, glued or ultrasonically bonded together and where, for illustration, the pin is given a narrow-waisted double truncated cone shape. Different facets of the module are identified as follows: "36" is the pin; "37" are the sidewalls; "38" are the male and "39" are the female connectors; "40" is the scoop in the interior sidewall; "41" is the barrel; "42" is the socket within the barrel; and "43" is the sprocket holder.

Figure 7:
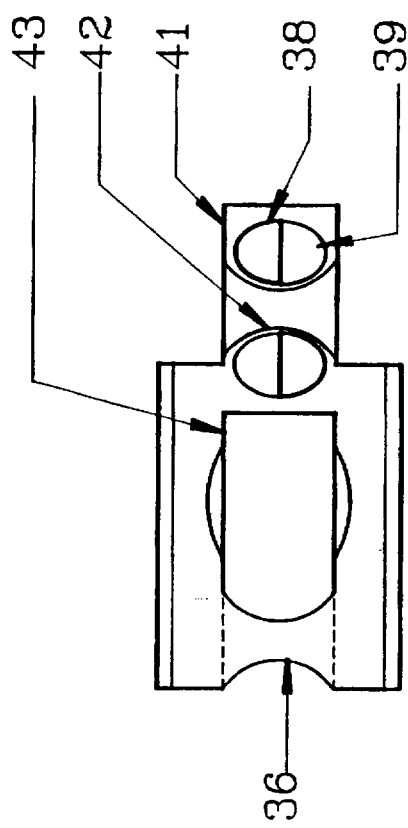
FIG. 7 generally illustrates a single half-module, or link, of the chain in a preferred FIG. 6 type embodiment viewed from above.

FIG. 7 generally illustrates a single half-module, or link, of the chain in a preferred FIG. 6 type embodiment viewed from above where the module is divided into two symmetrical halves, a true upper half and a true lower half, with opposing connectors capable of being snapped, glued or ultrasonically bonded together. Different facets of the module are identified as follows: "36" is the pin; "37" are the sidewalls; "38" are the male and "39" are the female connectors; "40" is the scoop in the interior sidewall; "41" is the barrel; "42" is the socket within the barrel; and "43" is the sprocket holder.

Figure 8:
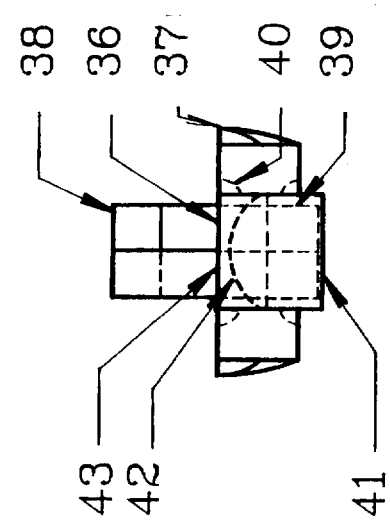
FIG. 8 generally illustrates a single half-module, or link, of the chain in a preferred FIG. 6 type embodiment viewed from the female end.

FIG. 8 generally illustrates a single half-module, or link, of the chain in a preferred FIG. 6 type embodiment viewed from the female end where the module is divided into two symmetrical halves, a true upper half and a true lower half, with opposing connectors capable of being snapped, glued or ultrasonically bonded together. Different facets of the module are identified as follows: "36" is the pin; "37" are the sidewalls; "38" are the male and "39" are the female connectors; "40" is the scoop in the interior sidewall; "41" is the barrel; "42" is the socket within the barrel; and "43" is the sprocket holder.

Figures 9, 11:
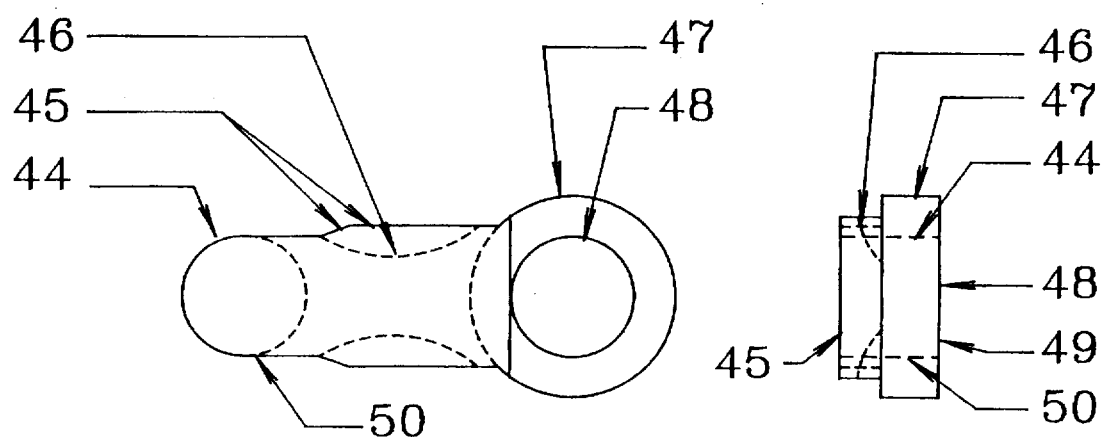
FIG. 9 generally illustrates a single half-module, or link, of the chain in a preferred male-female embodiment viewed from one side where the module is divided into two symmetrical halves, a true left and a true right half, with opposing connectors capable of being snapped, glued or ultrasonically bonded together and where, for illustration, a variant straight cylindrical shape is given the pin and socket.
FIG. 11 generally illustrates a single half-module, or link, of the chain in a preferred FIG. 9 type embodiment viewed from the female end.

FIG. 9 generally illustrates a single half-module, or link, of the chain in a preferred male-female embodiment viewed from one side where the module is divided into two symmetrical halves, a true left and a true right half, with opposing connectors capable of being snapped, glued or ultrasonically bonded together and where, for illustration, a variant straight cylindrical shape is given the pin and socket. Different facets of the module are identified as follows: "44" is the pin; "45" are the sidewalls; "46" is the scoop in the interior sidewall; "47" is the barrel; "48" is the socket within the barrel; "49" is the sprocket holder; and "50" are the connectors.

Figure 10:
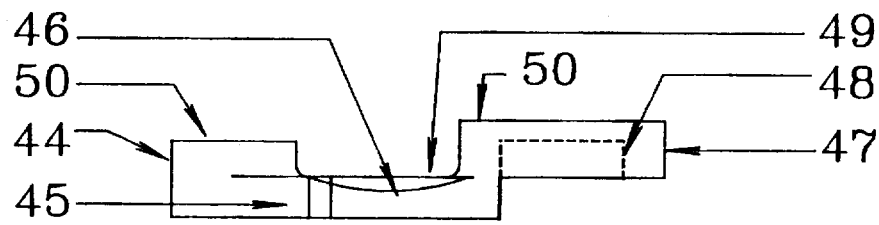
FIG. 10 generally illustrates a single half-module, or link, of the chain in a preferred FIG. 9 type embodiment viewed from above.

FIG. 10 generally illustrates a single half-module, or link, of the chain in a preferred FIG. 9 type embodiment viewed from above where the module is divided into two symmetrical halves, a true left and a true right, with opposing connectors capable of being snapped, glued or ultrasonically bonded together. Different facets of the module are identified as follows: "44" is the pin; "45" are the sidewalls; "46" is the scoop in the interior sidewall; "47" is the barrel; "48" is the socket within the barrel; "49" is the sprocket holder; and "50" are the connectors.

Figure 12:
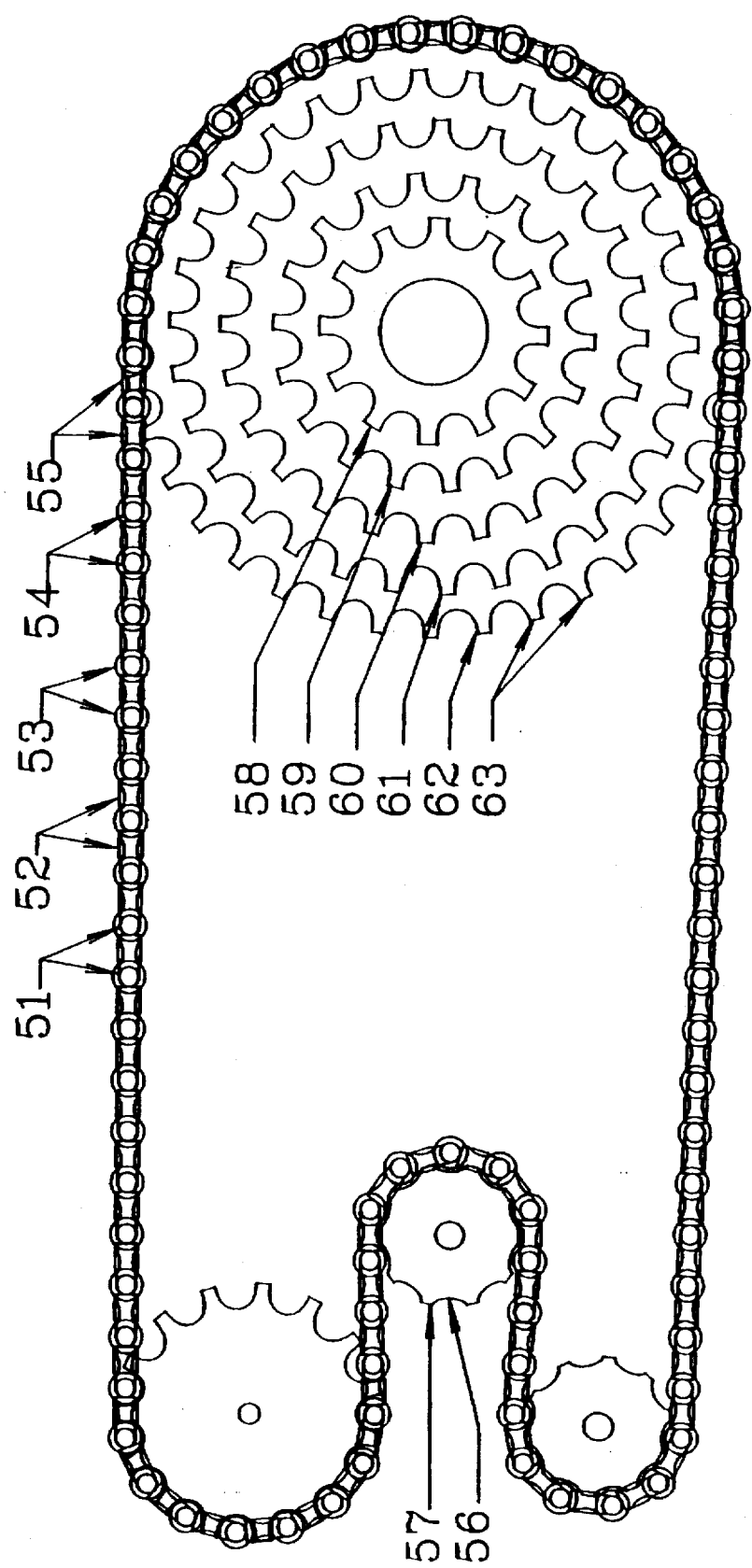
FIG. 12 illustrates generally illustrates a side view of a completed loop of rotatably joined FIG. 1 type "male-female" modules, forming an endless chain, and set to turn around and be turned by a plurality of sprocket wheels (as in a derailleur bicycle application, thus illustrating, by the reverse curve, use of what might ordinarily be thought of as the chain's reverse side). Also illustrated is a cluster of multi-stage sprocket wheels fashioned of a light weight plastic.

FIG. 11 generally illustrates a single half-module, or link, of the chain in a preferred FIG. 9 type embodiment viewed from the female end where the module is divided into two symmetrical halves, a true left and a true right half, with opposing connectors capable of being snapped, glued or ultrasonically bonded together. Different facets of the module are identified as follows: "44" is the pin; "45" are the sidewalls; "46" is the scoop in the interior sidewall; "47" is the barrel; "48" is the socket within the barrel; "49" is the sprocket holder; and "50" are the connectors. FIG. 12 illustrates generally illustrates a side view of a completed loop of rotatably joined FIG. 1 type "male-female" modules, forming an endless chain, and set to turn around and be turned by a plurality of sprocket wheels (as in a derailleur bicycle application, thus illustrating, by the reverse curve, use of what might ordinarily be thought of as the chain's reverse side). Also illustrated is a cluster of multi-stage sprocket wheels fashioned of a light weight plastic.

Different facets of the chain module are identified as follows: "51" is the pin; "52" are the sidewalls; "53" is the barrel; "54" is the socket within the barrel; and "55" is the sprocket holder.

The derailleur reverse curve wheel is "56" and its teeth are "57." Different facets of the sprocket wheel cluster are identified as follows: "58" is smallest of concentric sprocket wheels; "59" is a somewhat larger sprocket wheel; "60" is a medium sized sprocket wheel; "61" is a larger sprocket wheel; "62" is a large sprocket wheel; "63" are the sprocket wheel cluster's teeth.

The sprocket holder, "55," is a cavity which goes through from top to bottom of each link of the chain and thus receives equally well the teeth of the derailleur's reverse curve, "56," and the teeth of the cluster, "63."

Figure 13:
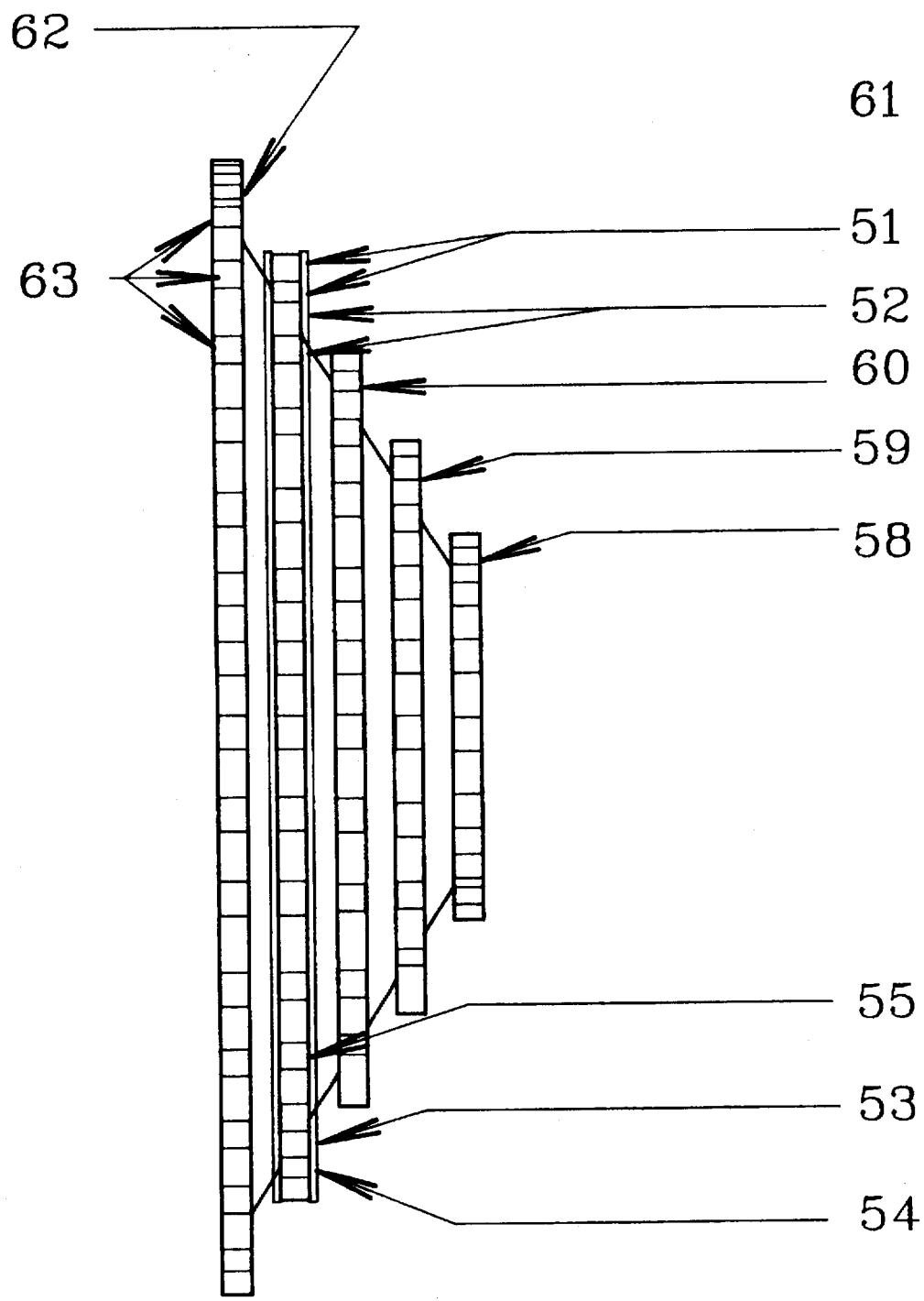
FIG. 13 generally illustrates an end view of a completed loop of rotatably joined FIG. 1 type "male-female" modules, forming an endless chain, and set to turn around and be turned by a one sprocket wheel of a multi-stage sprocket wheel cluster. Also illustrated is a multi-stage sprocket wheel fashioned of a light weight plastic, the teeth of which are, or may be, somewhat wider than are those of conventional metal sprocket wheels.

FIG. 13 illustrates generally illustrates an end view of a completed loop of rotatably joined FIG. 1 type "male-female" modules, forming an endless chain, and set to turn around and be turned by a one sprocket wheel of a multi-stage sprocket wheel cluster. Also illustrated is a multi-stage sprocket wheel.

Different facets of the chain module are identified as follows: "51" is the pin; "52" are the sidewalls; "53" is the barrel; "54" is the socket within the barrel; and "55" is the sprocket holder.

Different facets of the sprocket wheel cluster are identified as follows: "58" is smallest of concentric sprocket wheels; "59" is a somewhat larger sprocket wheel; "60" is a medium sized sprocket wheel; "61" is a larger sprocket wheel; "62" is a large sprocket wheel; "63" are the sprocket wheel cluster's teeth.

The multi-stage sprocket wheel cluster ("58–63") is fashioned of a light weight plastic of similar hardness to that of the plastic modular chain. The wheels of the cluster need not be solid stand-alone disks but, to reduce weight, might be rings supported by spokes or other infrastructure. As shown by the unlabeled straight diagonal lines in this drawing, which represent the edges of a socket but internally braced plastic cone on which the rings are mounted, the wheels can and usually would be connected to one another integrally and/or through a common infrastructure. The teeth, "63," of these sprocket wheels are, or may be, somewhat wider than are those of conventional metal sprocket wheels. This is done to provide extra strength and durability to the teeth, "63." To do so is possible because all sprocket holders of the chain of the present invention, "55," are equally wide, not alternatingly wide and narrow as in conventional chains.

Alternatively, one could narrow the chain and cluster the sprocket wheels more closely together. Such a solution would make sense where the ability to add more gears was of paramount importance and, particularly, where the weight of metal sprocket wheels was acceptable.

Figure 14:
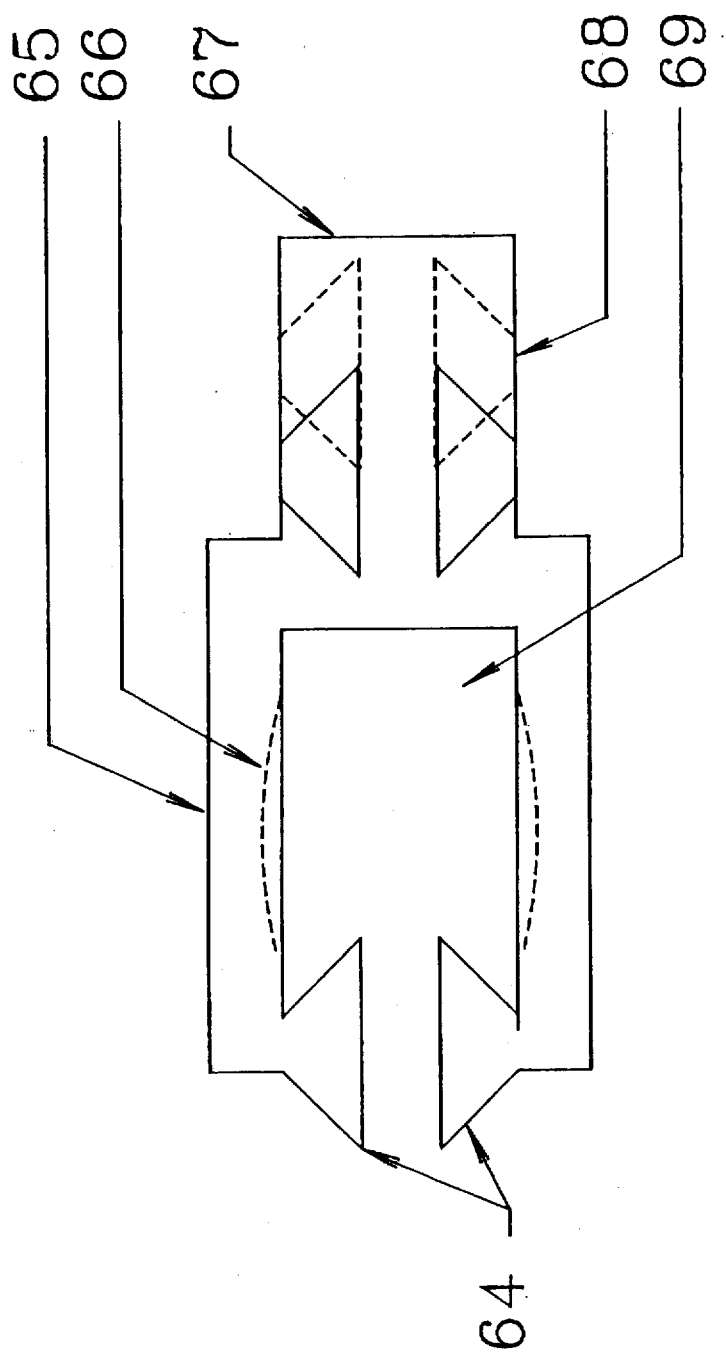
FIG. 14 generally illustrates a top view of another type of variant single module, or link, of the chain in a preferred split-pin embodiment (where the line of division between the unitary module's two joined halves or parts is not shown).

FIG. 14 generally illustrates a top view of another type of variant single module, or link, of the chain in a preferred dual or split-pin embodiment (where the module is unitary, and the pins enter the socket via a channel). Different facets of the module are identified as follows: "64" are the pins; "65" are the sidewalls; "66" is the channel opening, through which the pin slides to "68;" "67" is the barrel; "68" is the socket within the barrel; and "69" is the sprocket holder. Succeeding modules of this type can be easily joined and separated when the chain is under no tension; under tension, however, the pins of one module cannot work backwards out the channel of its neighbor to escape its socket. To further prevent unintended disassembly, the channels could be narrowed and the pins flattened at their ends which make least contact during pivots under tension; if this were done, then the two modules would have to be held in a particular angular relationship, not one normally encountered in use under tension, in order to separate.

Figure 15:
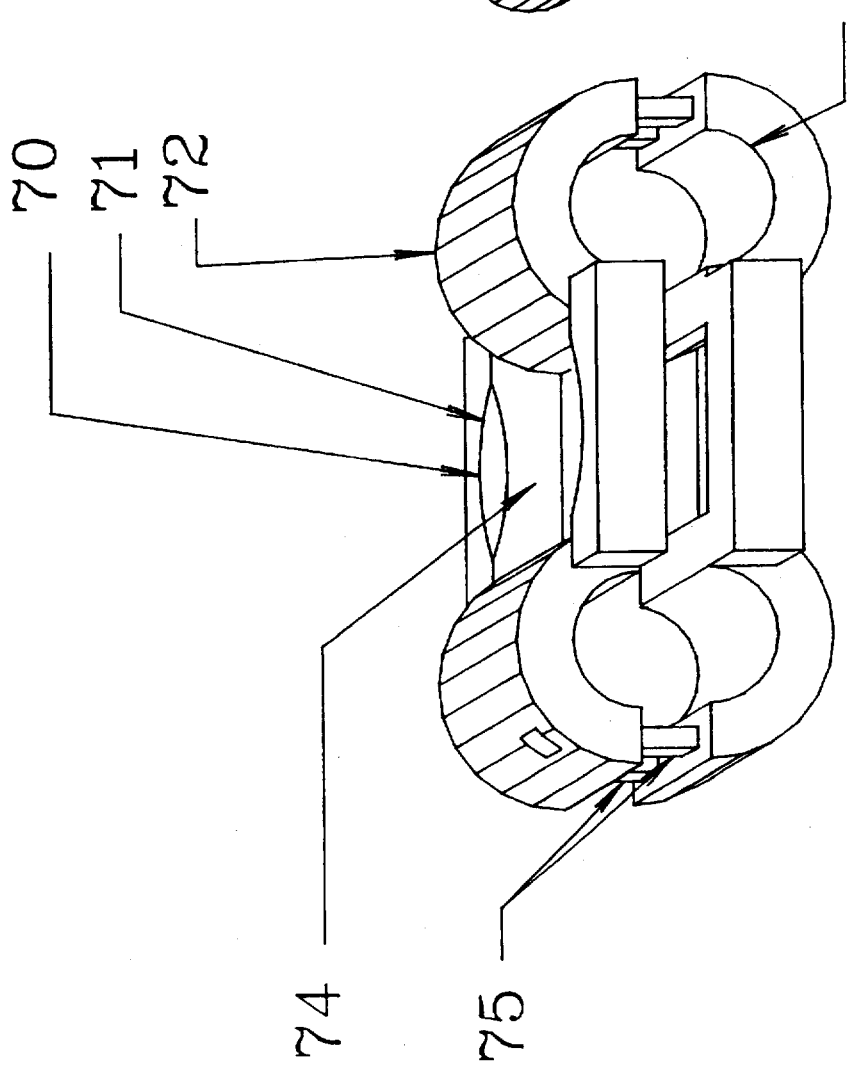
FIG. 15 generally illustrates an angle view of a "double female" type module disassembled into upper and lower halves.

FIG. 15 generally illustrates an angle view of a "double female" type module disassembled into upper and lower halves. Different facets of the chain module are identified as follows: "70" are the sidewalls; "71" is the scoop in the interior sidewall; "72" are the barrels; "73" are the sockets within the barrels; and "74" is the sprocket holder. Connecting fasteners, "75," are shown to snap the two halves of the module together, or to help them remain together once they have been joined mechanically or by glue, ultrasonic bonding, or the like. The "73" socket-side seams of the barrel, "72," are shown beveled back slightly to reduce the change of protrusions which could cause friction between it and a contained neighboring module's male pin to occur in use. This module is for use in alternation with the "double male" module shown in FIG. 16. It makes a good loop closer but may have a tendency to come apart when the chain is under tension.

Figure 16:
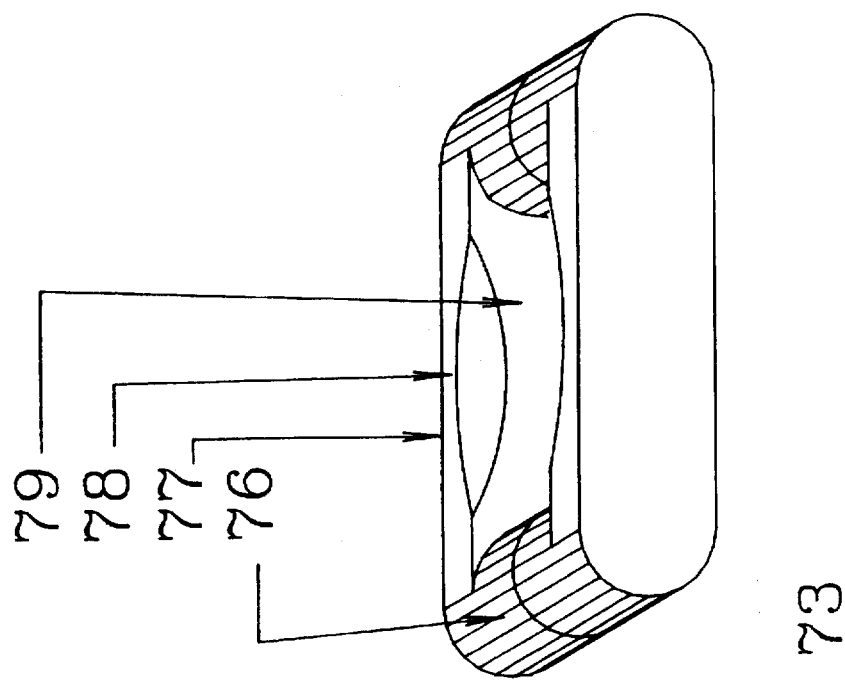
FIG. 16 generally illustrates an angle view of a single piece "double male" type module, designed for use in alternation with the FIG. 15 type module.

FIG. 16 generally illustrates an angle view of a "double male" type module designed for use in alternation with the FIG. 15 type module. Different facets of the module are identified as follows: "76" are the pins; "77" are the sidewalls; "78" are the scoops in the interior sidewalls; and "79" is the sprocket holder. This module can be manufactured in one single part. This is advantageous in terms of manufacturing and assembly cost and also in terms of reducing friction which could result from uneven seams where module halves are joined together.

FIG. 17 generally illustrates an angle view of a "double female" type module (alternate to that of FIG. 18) manufactured in one single piece. Different facets of the module are identified as follows: "80" are the sidewalls; "81" is the scoop in the interior sidewall; "82" are the barrels; "83" are the sockets within the barrels; and "84" is the sprocket holder.

FIG. 18 generally illustrates an angle view of a "double male" type module which is split into right and left halves and is designed for use in alternation with the FIG. 17 type module. Different facets of the module are identified as follows: "85" are the pins; "86" are the sidewalls; "87" are the scoops in the interior sidewalls; and "88" is the sprocket holder.

Figure 19:
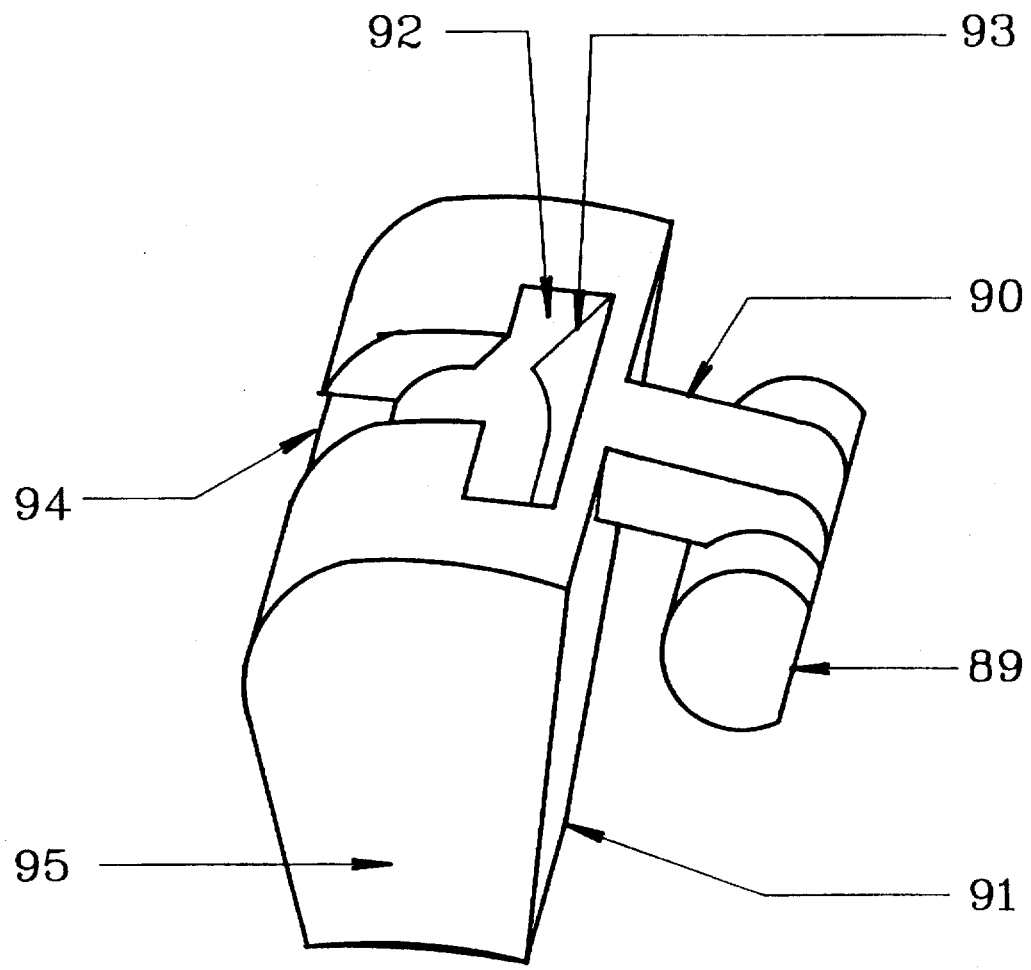
FIG. 19 generally illustrates a perspective view of a single module of the belt (link of the chain) in a preferred V-belt style embodiment.

FIG. 19 generally illustrates a perspective view of a single module of the belt (link of the chain) in a preferred V-belt style embodiment. It is of one piece as shown here (but see FIGS. 26, 46, 47, 48), probably injection molded plastic. Different facets of the module are identified as follows: "89" is the pin; "90" is the neck; the rest of the module, taken together, is the body, "91"; of which the following parts are identified: "92" is the socket; "93" is the channel; "94" is the notch; and "95" is the sidewall. The sidewall, "95," might be hatchmarked or otherwise treated so as to adhere well in use to the V-groove of a pulley. Alternatively, the "95" sidewalls could be of a different, more adhesive material bonded or snapped to the primary module; in such case the module would be of two or three pieces, not one piece.

Figure 20:
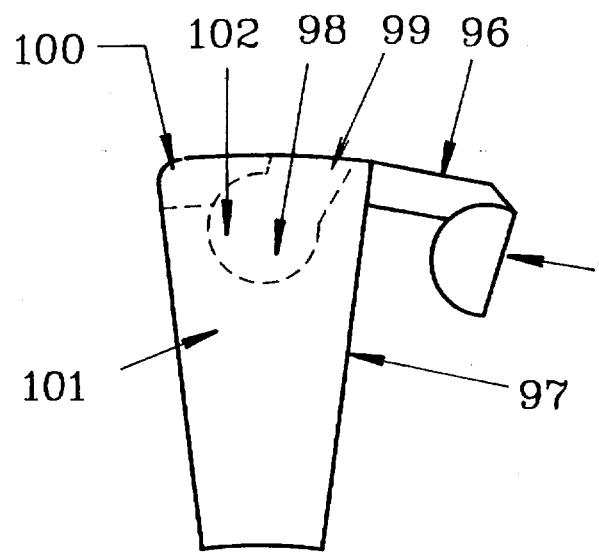
FIG. 20 generally illustrates a single module of the belt (link of the chain) in a preferred V-belt style embodiment viewed from one side.

FIG. 20 generally illustrates a single module of the belt (link of the chain) in a preferred FIG. 19 V-belt style embodiment viewed from one side. Different facets of the module are identified as follows: "96" is the pin; "97" is the neck; the rest of the module, taken together, is the body, "98"; of which the following parts are identified: "99" is the socket; "100" is the channel; "101" is the notch; and "102" is the sidewall.

Figure 21:
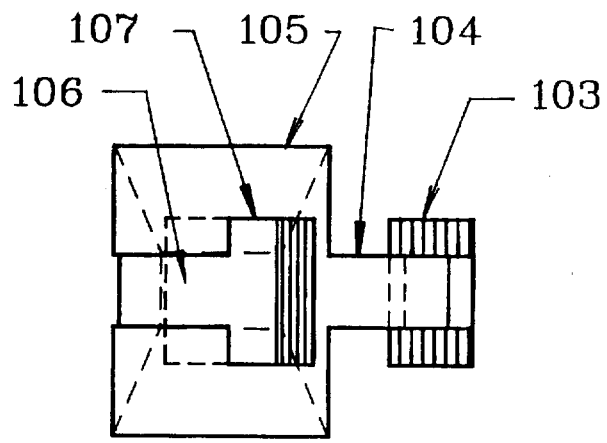
FIG. 21 generally illustrates a single module of the belt (link of the chain) in a preferred V-belt style embodiment viewed from above.

FIG. 21 generally illustrates a single module of the belt (link of the chain) in a preferred FIG. 19 V-belt style embodiment viewed from above. Different facets of the module are identified as follows: "103" is the pin; "104" is the neck; the rest of the module, taken together, is the body, "105"; of which the following parts are identified: "106" is the socket; "107" is the channel; and "108" is the notch.

Figure 22:
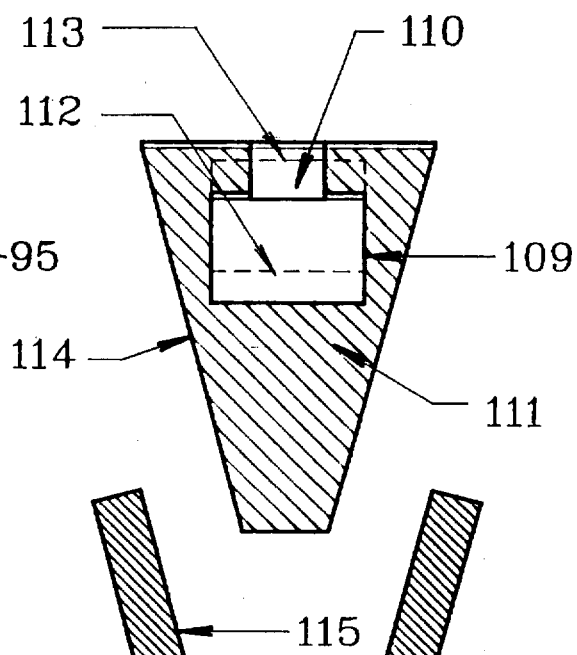
FIG. 22 generally illustrates a single module of the belt (link of the chain) in a preferred V-belt style embodiment viewed from one end.

FIG. 22 generally illustrates a single module of the belt (link of the chain) in a preferred FIG. 19 V-belt style embodiment viewed from one end. Different facets of the module are identified as follows: "109" is the pin; "110" is the neck; the rest of the module, taken together, is the body, "111"; of which the following parts are identified: "112" is the socket; "113" is the channel; and "114" is the sidewall.

Figure 23:
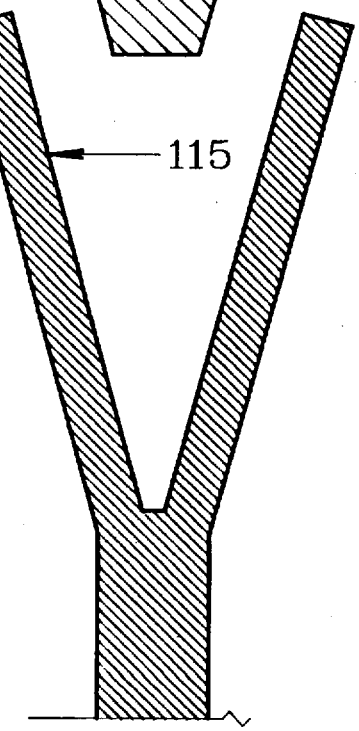
FIG. 23 illustrates an end view of a V-groove pulley into which the module of FIG. 22 would fit.

FIG. 23 illustrates an end view of a V-groove pulley into which the module of FIG. 22 would fit, showing its inner surfaces "115." It should be noted that the module of FIG. 22's two facet "114" sidewalls contact inner surfaces "115" of the pulley's V-Groove over a large surface area, deeper into the "V" than would a traditional belt.

Figure 24:
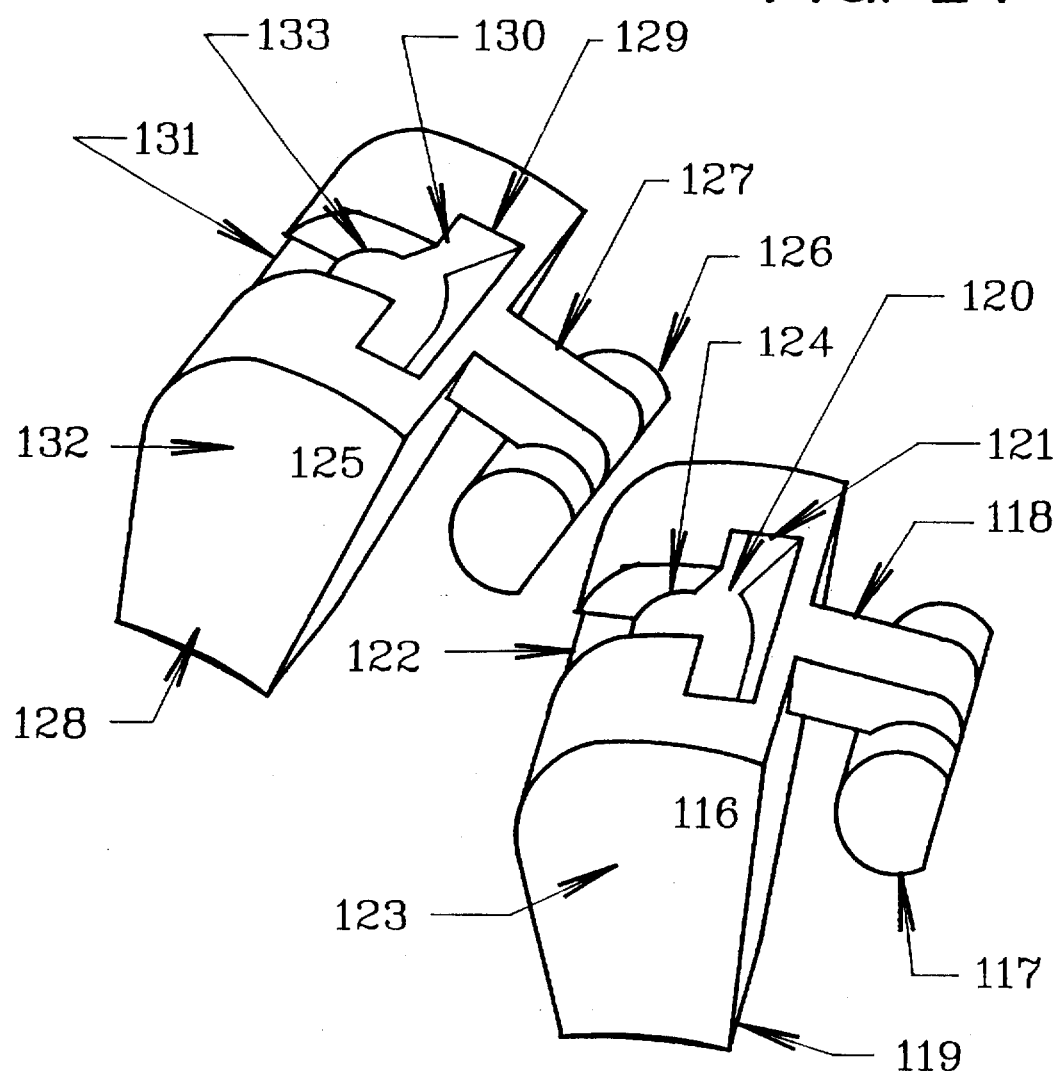
FIG. 24 illustrates from an angle two modules of the belt (links of the chain) poised to be snapped together.

FIG. 24 illustrates from an angle two FIG. 19 type modules of the belt (links of the chain) poised to be snapped together. Module 1 ("116") is depicted leading, its pin, "117," forward. "118" is the neck; the rest of the module, taken together, is the body, "119"; of which the following parts are identified: "120" is the socket; "121" is the channel; "122" is the notch; "123" is the sidewall; and "124" is the rearward interior surface of the socket, "120." Module 2 ("125") trails the first module, its pin, "126," also forward. Here it can be seen that Module 2's pin "126" will drop into Module 1's socket "120", while its neck, "127", will drop into Module 1's notch "122". The rest of Module 2, taken together, is the body, "128", of which the following parts are identified: "129" is the socket; "130" is the channel; "131" is the notch; "132" is the sidewall; and "133" is the rearward interior surface of the socket, "129."

In similar fashion a chain of any predetermined length can be assembled by snapping together the requisite number of modules, including, modules the necks and/or bodies of which may be of various alternate lengths. The chain can be assembled and taken apart easily because the flattened cylindrical pin of one module, e.g. "126," will pass easily through its neighbor's channel, "121," if it is angled in a certain way to present a narrow facet, as it can be when the chain is not under tension. However, in use the chain is under linear tension and will not disassemble unintentionally because such tension causes the pin, "126," to be held snugly in its neighbor's socket, "120," with friction occurring primarily at the socket's rearward interior surface, "124." When the two modules pivot with respect to one another, the face of pin, "126," which is presented to the channel, "121," is broader than the channel and hence will not fit through.

Also shown in FIG. 24 is an angle view of a V-belt pulley, "134," and of its interior surfaces, "135," against which the sidewalls of the two modules, were they in use as a chain, might come into contact. The belt or chain formed as in this Figure by multiple modules may travel in either direction without unsnapping itself. The indicated, pin forward, direction of motion is preferred to minimize friction between the pulley's interior surfaces, "135," and the sidewalls ("123" and "132") when the two come together. This is so because the leading pin, "117," can orient to the curvature of the pulley, "134," from the straight path it has been following without contacting the pulley's interior surface, "135;" and by the time that sidewalls "123" contact "134," the pin, "117," will have pivoted into the curvature and pulled the sidewalls "123" into alignment.

Friction occurs between the snapped links primarily where Module 2's pin, "126," curved rearward surface contacts, is pulled along by, and rotates against the rearward interior surface, "124," of Module 1's socket, "120." Such rotation occurs particularly as the links orient themselves alternately to straight courses between pulleys and to more circular paths around pulleys. Such friction may be minimized by self-lubricating characteristics of the material of which the modules, and these friction-bearing surfaces in particular, are made; also, in the flex material alternate embodiment, by flexing of the modules' necks, reducing thus the distance of rotation between the bearing surfaces. Module 2's neck, "127," travels within Module 1's notch, "122," without contact or friction as the links re-orient themselves to the courses between and over pulleys. The sidewalls, "123" and "132," do not substantially flex or distort in contact with the V-Groove's interior surfaces, "134," as those of a conventional fan belt would do (except to the extent that one might design it to do so). The module is under little pressure to flex due to the ease of slip between the modules at their sole regions of friction.

Figure 25:
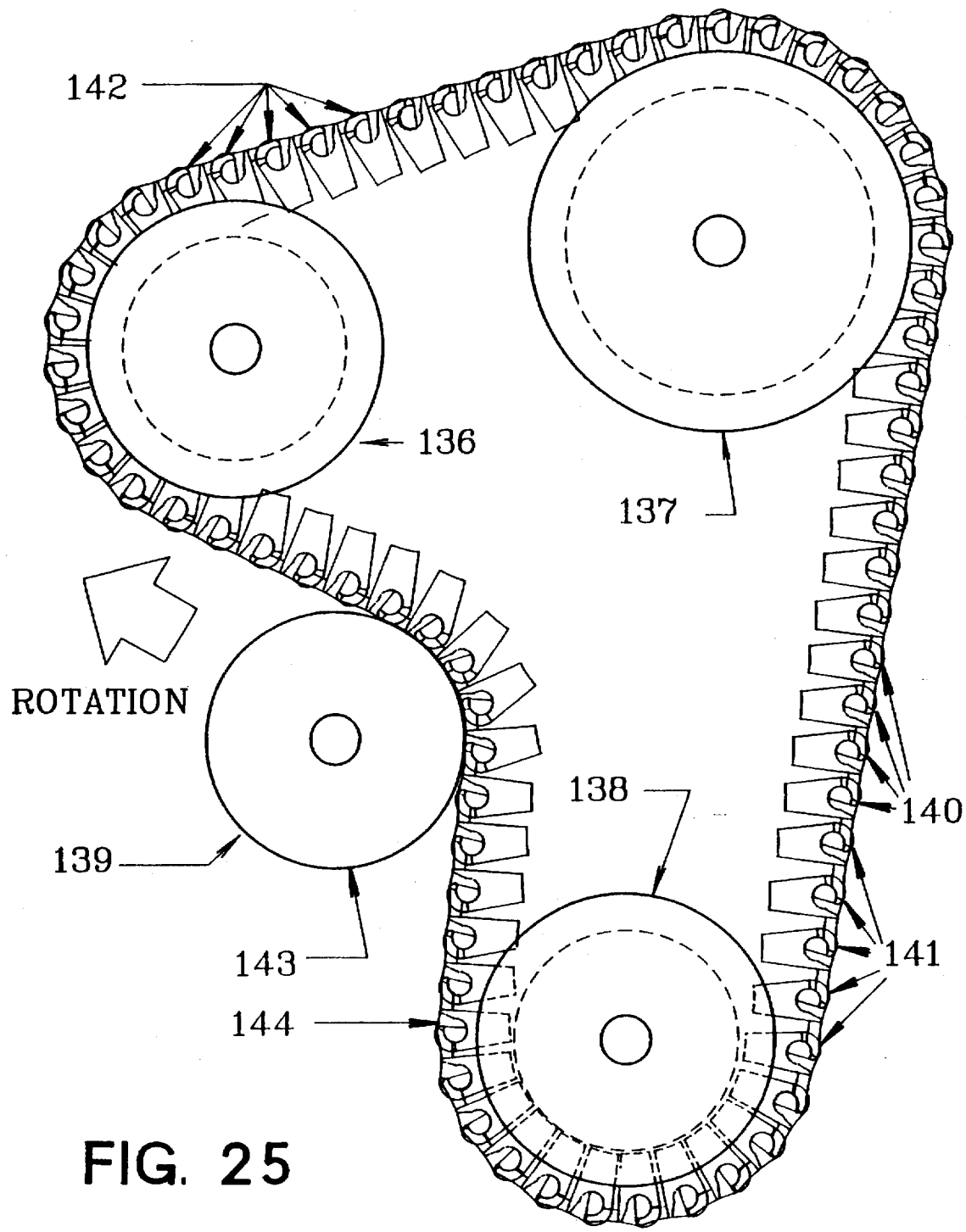
FIG. 25 generally illustrates a side of a completed loop of modules, including several variant module types, forming a belt or chain. In this figure more than two pulleys are involved and there is at least one reverse curve so as to necessitate use of what might ordinarily be thought of as the belt or chain's reverse side.

FIG. 25 generally illustrates a side of a completed loop of modules, including several variant module types, forming a belt or chain. In this figure four pulleys are shown, "136," "137," "138," and "139," and there is at least one reverse curve, around pulley "139," so as to necessitate use of what might ordinarily be thought of as the belt or chain's reverse side. The standard module shown in FIGS. 19 through 24 is identified as "140" in this Figure; many of them are shown snapped together as FIG. 24 shows them poised to be. Shown as "141" is a variant module like module "140" except that its neck is slightly longer than is that of "140." The person constructing a continuous belt or chain from a combination of such modules can achieve a great many different precise lengths, particularly where the module necks or bodies are not all to one standard length.

Figure 27:
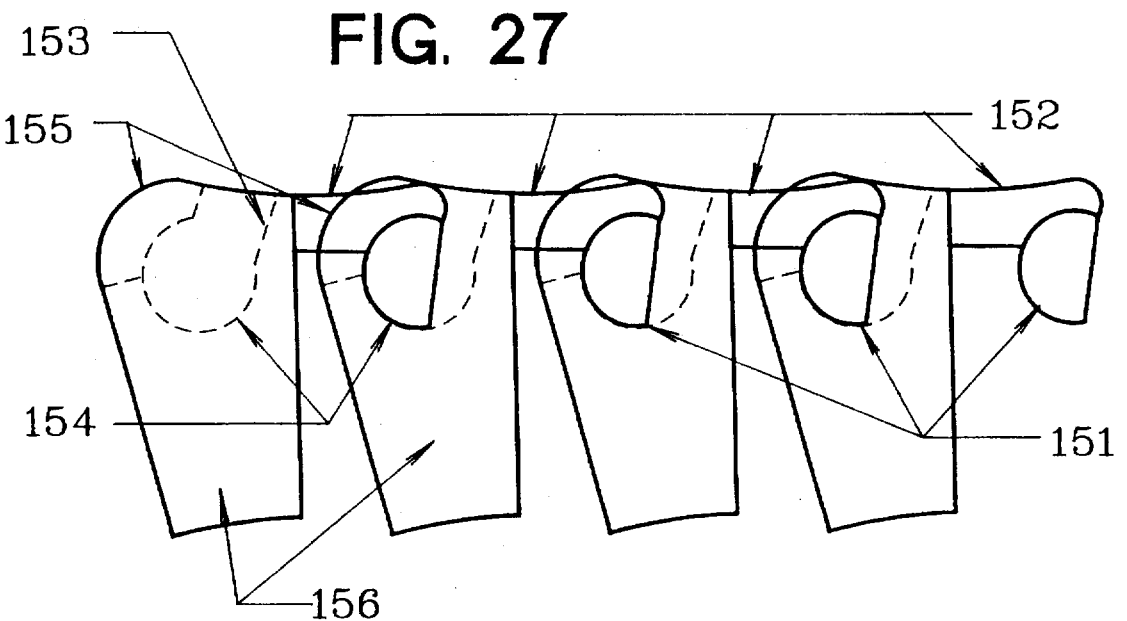
FIG. 27 generally illustrates a side view of a chain of modules of the variant type shown in FIG. 26, non-removeably attached within such chain but removeably interconnecting at each extremity.
Figure 28:
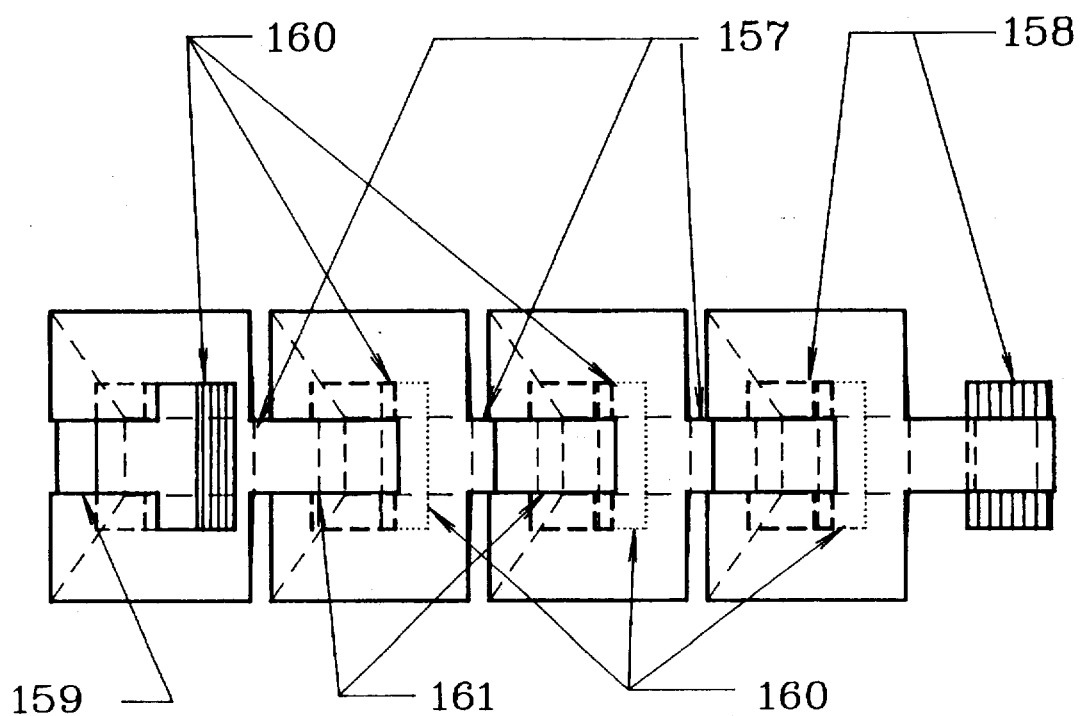
FIG. 28 generally illustrates a top view of a chain of modules of the variant type shown in FIG. 26, non-removeably attached within such chain but removeably interconnecting at each extremity.

A third, multiple-link type of module, shown in more detail in FIGS. 26, 27 and 28, is labeled "142" in this Figure. It is designed not to disassemble readily or at all between the pivoting links which comprise it. Only at its extremities does it removeably interconnect with other modules such as of the "140," "141" or "142" types shown in this Figure. Except at its female extremity, its slot is not open at the top.

Pulleys "136", "137", and "138" in this FIG. 25 are V-groove pulleys, the inner surfaces of which contact the sidewalls of each module. (See FIG. 22, "114," and FIG. 23, "115.") Pulley "139" is not V-grooved but is shown in this Figure as shaped like a cylinder having a traction surface, "143." Surface "143" of Pulley "39" is contacted by the top, "144" of each module, as the belt or chain moves around Pulley "139" under tension, causing Pulley "139" to be rotated.

FIG. 26 generally illustrates a top view of two two-piece V-belt style modules, one assembled, the other unassembled. Each consists of a smaller piece, "145," and a larger piece, "146," the two pieces bonded together so that the pin, "147," of one module is non-detachably contained, and can pivot within, the socket, "148," of the adjoining module. The neck, "149," of each module would pass, and within a range of motion would be free to pivot, through the notch, "150," of the module lined up in front of it. This module type is useful particularly for forming multiple link modules as shown in FIGS. 27 and 28 and as "142" in FIG. 125. It is conceived by way of manufacturing process that a row of the larger halves, "146," could be held in place in a line by a frame, the pin, "147," of one resting unattached as much as possible inside the socket, "148," of the next; then a like number of smaller halves, "145;" perhaps held in a different frame, be moved adjacent to their counterpart halves and simultaneously bonded, glued or snapped together to complete each link's body in manner so as to contain the pin of the neighboring link.

FIG. 27 generally illustrates a side view of a chain of multiple modular links of the variant type shown in FIG. 26. Within such chain, each modular link is non-removeably attached to its neighbor. At one extremity of such a module or chain, the end link is fashioned like the leading end of a FIG. 19 type module; at the other extremity, the end link is fashioned like the trailing end of a FIG. 19 module. Thus, the multiple link module itself is capable of being removeably interconnected with other modules either like itself or like the FIG. 19 type module or with variants thereof. Different facets of the bonded links comprising such a module are identified as follows: "151's" are the pins; "152's" are the necks; "153" is the lone channel at the trailing end of the multiple link module; "154's" are the sockets; "155's" are the notches; and "156's" are the sidewalls, the surfaces of which might be hatchmarked for adhesion, and are tapered to fit a V-groove pulley. Unlike FIG. 19, the FIG. 27 module has no channel, except at its trailing end, through which a pin can exit. Thus each pin, "151," save the one leading, is permanently trapped inside the socket, "154," of the link in front of it. It cannot be disassembled easily or at all. Even so, each notch, "156," permits each neck, "151," to pivot through as many degrees of rotation as is the case with pairs of FIG. 19 type modules.

FIG. 28 generally illustrates a top view of a chain of multiple modular links of the variant type shown in FIG. 26. Within such chain, each modular link is non-removeably attached to its neighbor. At one extremity of such a module or chain, the end link is fashioned like the leading end of a FIG. 19 type module; at the other extremity, the end link is fashioned like the trailing end of a FIG. 19 module. Thus, the multiple link module itself is capable of being removeably interconnected with other modules either like itself or like the FIG. 19 type module or with variants thereof. Different facets of the bonded links comprising such a module are identified as follows: "157's" are the pins; "158's" are the necks; "159" is the lone channel at the trailing end of the multiple link module; "160's" are the sockets; "161's" are the notches; and "162's" are the sidewalls, the surfaces of which are tapered to fit a V-groove pulley. Unlike FIG. 19, the FIG. 27 module has no channel, except at its trailing end, through which a pin can exit. Thus each pin, "157," save the one leading, is permanently trapped inside the socket, "160," of the link in front of it. It cannot be disassembled easily or at all. Even so, each notch, "161," permits each neck, "158," to pivot through as many degrees of rotation as is the case with pairs of FIG. 19 type modules.

FIG. 29 generally illustrates a variant module of the belt (link of the chain) with a plurality of side by side V shapes (to accomodate a pulley with multiple V notches); it is shown in a preferred embodiment viewed from one side. Different facets of the module are identified as follows: "163" is the pin; "164" is the neck; the rest of the module, taken together, is the body; "165," of which the following parts are identified: "166" is the socket; "167" is the channel; and "168" is the notch. "169" is a label given for identification to what we shall refer to as the rearward interior surface of socket, "166." (In motion, the pin, "163," should lead, for best results.) "170" is the sidewall (with hatchmarks omitted in this drawing).

FIG. 30 generally illustrates a variant module of the belt (link of the chain) with a plurality of side by side V shapes (to accomodate a pulley with multiple V notches); it is shown in a preferred embodiment viewed from one end. Three side by side V shapes are shown here; more or fewer could be utilized as needed or desired in any particular application. Different facets of the module are identified as follows: "171" is the pin; "172" is the neck; the rest of the module, taken together, is the body, "173," of which the following parts are identified: "174" is the socket; "175" is the channel; and "176" is the notch. "177" is the sidewall.

FIG. 31 generally illustrates a variant module of the belt (link of the chain) with a plurality of side by side V shapes (to accomodate a pulley with multiple V notches); it is shown in a preferred embodiment viewed from above. Three side by side V shapes are shown here; more or fewer could be utilized as needed or desired in any particular application. Different facets of the module are identified as follows: "178" is the pin; "179" is the neck; the rest of the module, taken together, is the body, "180," of which the following parts are identified: "181" is the socket; "182" is the channel; and "183" is the notch. "184" is the sidewall.

FIG. 32 generally illustrates a side view of a single module of the belt (link of the chain) in a preferred embodiment where a notched pulley is to be utilized. The chain formed by a series of such modules could be called a cog-chain or cog-belt. Different facets of the module are identified as follows: the "185" is the pin; "186" is the neck; "187" is the socket; "188" is the channel; "189" is the notch; "190" is the sidewall; "191" is the upper outward surface; and "192" is the lower outward surface.

FIG. 33 generally illustrates a top view of a FIG. 32 type single module of the belt (link of the chain) in a preferred embodiment where a notched pulley is to be utilized. Different facets of the module are identified as follows: the "193" is the pin; "194" is the neck; "195" is the body, of which the following parts are identified: "196" is the socket; "197" is the channel; "198" is the notch; and "199" is the sidewall. The body could be considerably wider than is here shown, and it probably would be in an application where the cog-chain were not required (as in FIG. 36) to shift, e.g. in a motorcycle chain. The module could be formed of one piece or assembled from two or more pieces.

FIG. 34 generally illustrates an end view of a FIG. 32 type module in a preferred embodiment where a notched pulley is to be utilized. Different facets of the module are shown as follows: the "200" is the pin; "201" is the neck; "202" is the body, of which the following parts are identified: "203" is the channel; "204" is the socket; "205" is the notch; and "206" is the sidewall. The body could be considerably wider than is here shown, and it probably would be in an application where the cog-chain were not required (as in FIG. 36) to shift, e.g. in a motorcycle chain. The module could be formed of one piece or assembled from two or more pieces.

Figure 35:
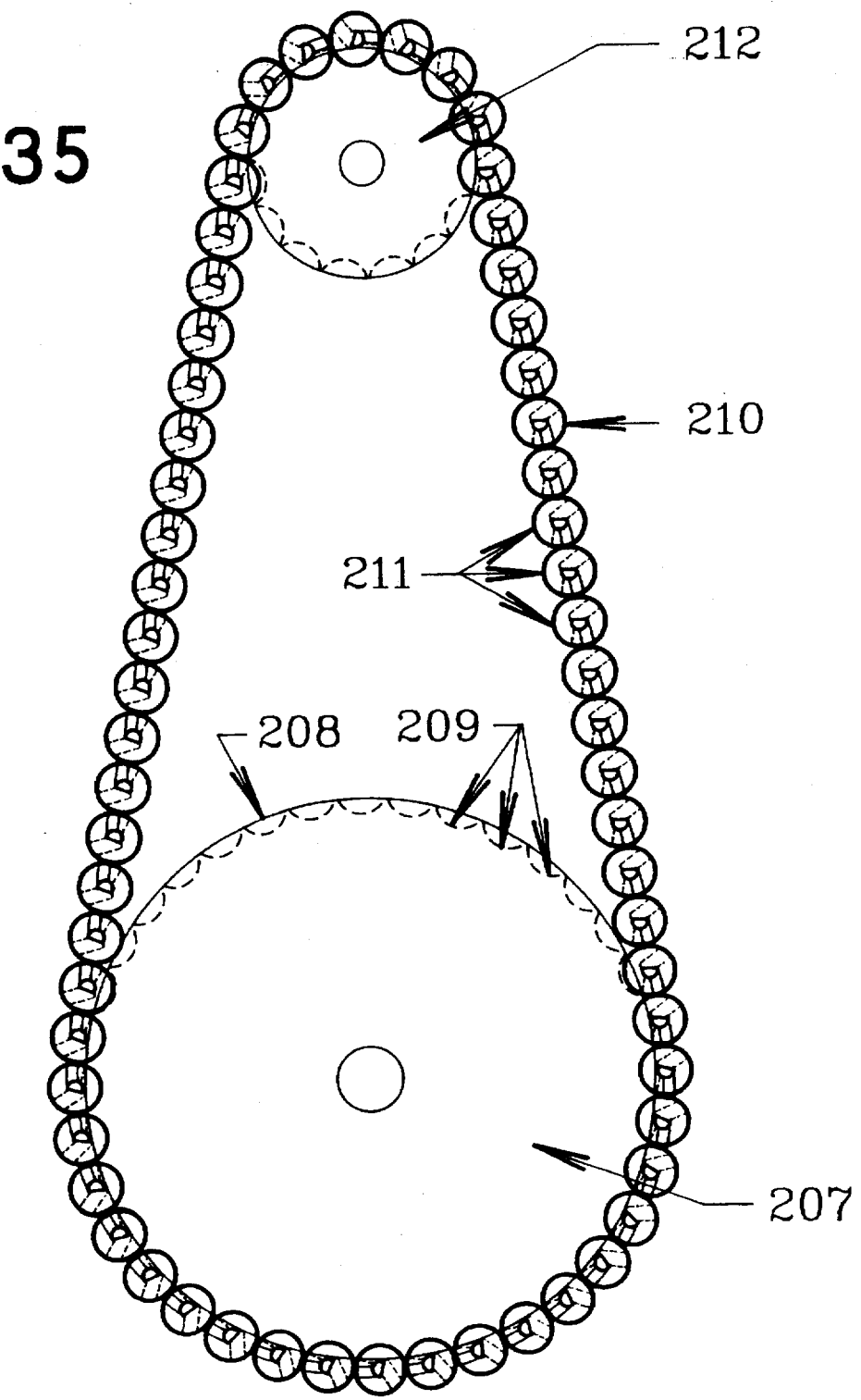
FIG. 35 generally illustrates a side view of a completed loop of FIG. 32 type modules, forming a belt or chain for use with notched pulleys, a preferred embodiment for, for example, a certain type of motorcycle or snow mobile drive system.

FIG. 35 generally illustrates a side view of a completed loop of FIG. 32 type modules, forming a belt or chain, "210," and circling two notched pulleys, "207" and "212," a preferred embodiment for, for example, a certain type of motorcycle or snow mobile drive system. "208" indicates the outer edge of the V-groove of the larger notched pulley wheel, "207." "209" shows a representative number of notches, i.e. semicircular concavities, situated within the V-groove and perpendicular to the turn of the pulley. These notches, "209," correspond to the semicircular convex surface of each chain module's surface "211," and the two surfaces grip and release each other as the chain under tension moves and is moved by the pulleys, transmitting torque between them.

Figure 36:
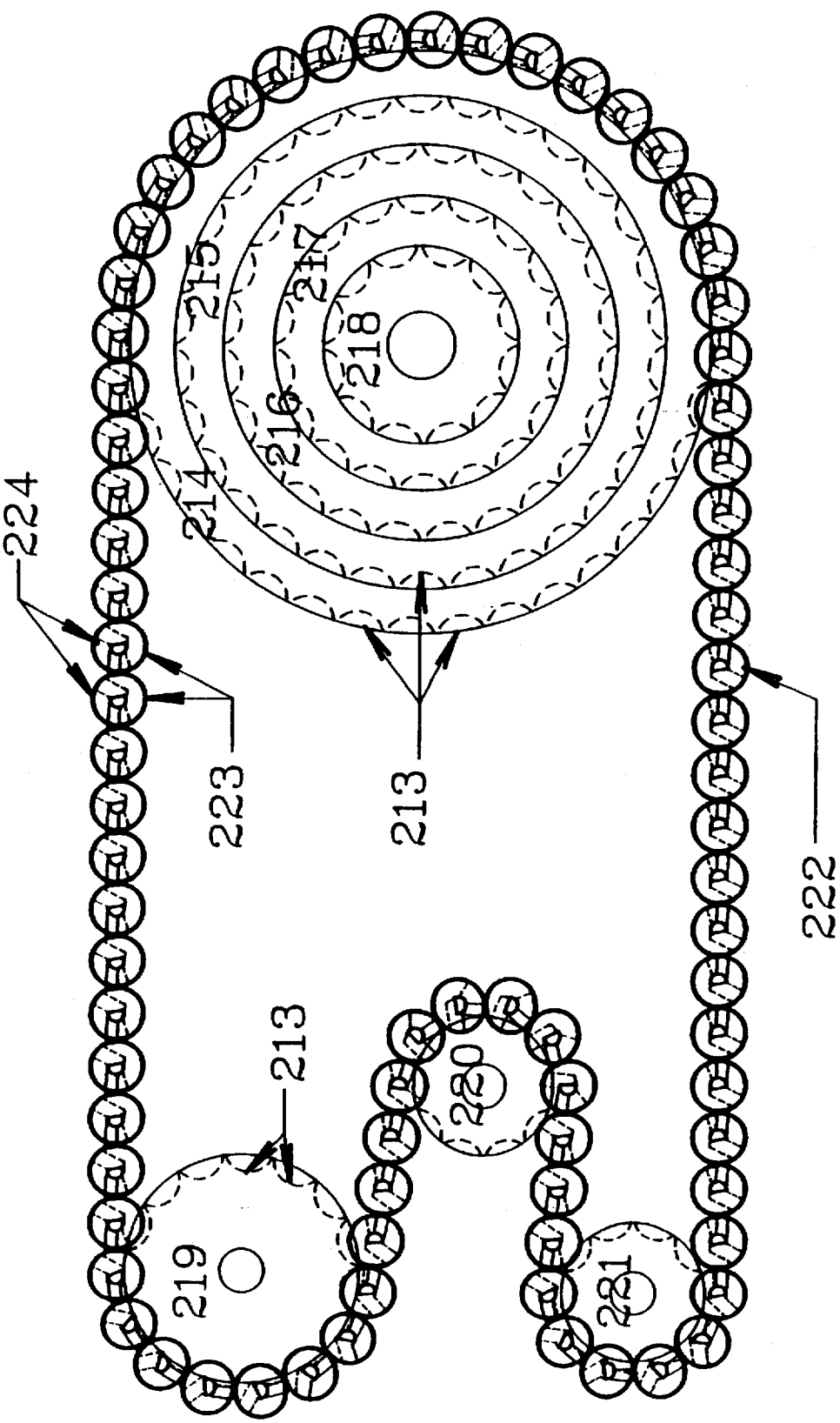
FIG. 36 generally illustrates a side view of a completed loop of FIG. 32 type modules, forming a belt or chain for use with a concentric series of cascading notched V-groove pulleys and showing reverse curves around a derailleur, a preferred embodiment for a multi-gear bicycle drive system.

FIG. 36 generally illustrates a side view of a completed loop of FIG. 32 type modules, forming a belt or chain, "222," for use with a concentric series of cascading notched V-groove pulleys and showing reverse curves around a derailleur, a preferred embodiment for a multi-gear bicycle drive system. Each pulley's notched V-groove has notch surfaces "213." The various pulley gear levels of the concentric cluster are identified as "214," "215," "216," "217," and "218." More could be shown. Other notched V-groove pulleys are labeled "219," "220," and "221." The surface of each notch's semicircular concavity perpendicular to the turn of the pulley is labeled "213" and corresponds to the semicircular convex surface of each chain module's inward surface "223," and, when the chain is geared to the particular gear level, the two surfaces grip and release each other as the chain under tension moves and is moved by the pulleys, transmitting torque between them. A like phenomenon occurs between each module's outer surface "224" and the corresponding concavities, "213," of the pulley, "220," which forms the chain's reverse curve.

Figure 37:
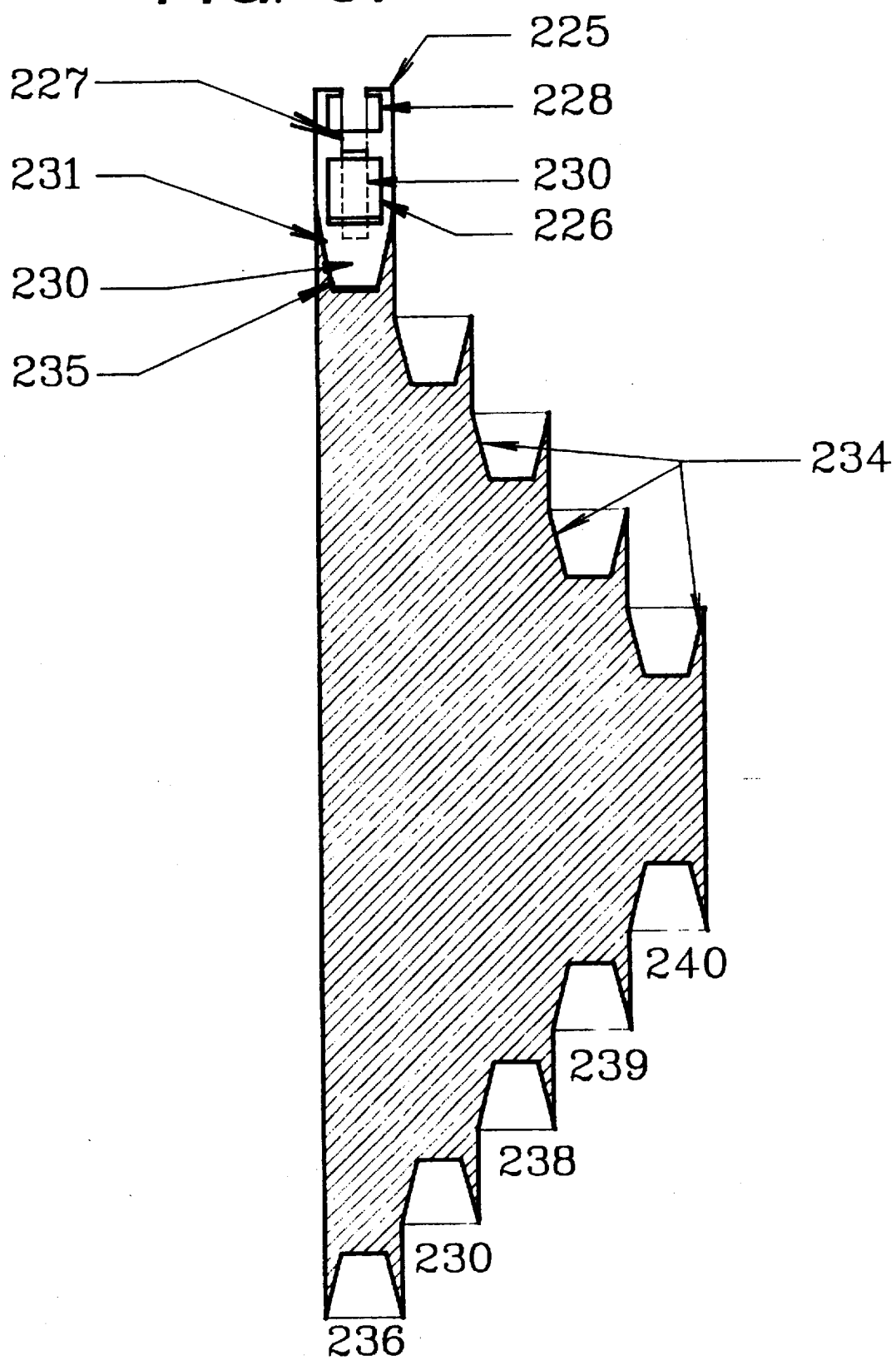
FIG. 37 generally illustrates an end view of a single FIG. 32 type module and an end (or top) view of a multi-step notched pulley wheel consisting of concentric series of cascading (staircase) notched V-grooves as shown in FIG. 36, in a preferred embodiment for use as a high performance bicycle chain and notched sprocket, shiftable gear, pulley system.

FIG. 37 generally illustrates an end view of a single FIG. 32 type module, identified as "225," and an end (or top) view of a multi-step notched pulley wheel consisting of concentric series of cascading (staircase) notched V-grooves as shown in FIG. 36, in a preferred embodiment for use as a high performance bicycle chain and notched sprocket, shiftable gear, pulley system. Such a multi-step notched pulley wheel, "226," would be lightweight, probably of cast plastic, with a spoked or strutted interior. Each step of the pulley wheel is a notched V-Groove with inner side surfaces "234." The slope of the "234" surfaces facilitate gear changes, for example, by lateral movement of a conventional bicycle derailleur. The various pulley gear levels are identified as "236," "237," "238," "239," and "240." More could be shown. Different facets of the module are identified by letter as follows: "226" is the pin; "227" is the neck; "228" is the channel; "229" is the socket; "230" is the notch; "231" is the sidewall; and "232" is the lower outward surface of the module.

Figure 38:
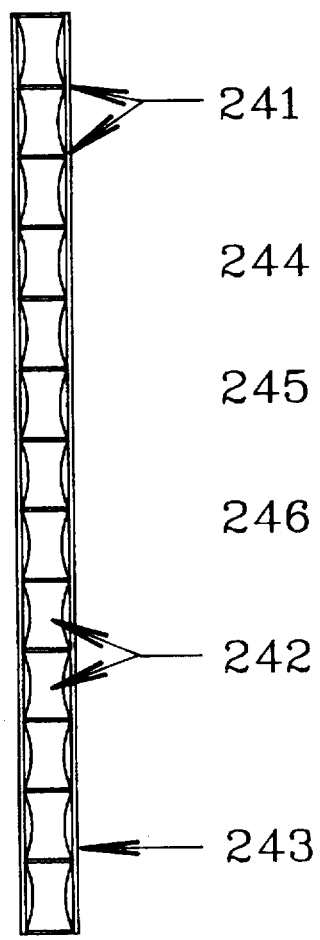
FIG. 38 generally illustrates a top view of a length of flexible material designed for retrofitting smooth V-groove pulleys so as to make them into notched V-groove pulleys.

FIG. 38 generally illustrates a top view of a length of flexible material designed for retrofitting smooth V-groove pulleys so as to make them into notched V-groove pulleys. It is shown here laid flat. Ridges are indicated by "241." Troughs are indicated by "242." Parallel sides of the flexible material are indicated by "243."

Figure 39:
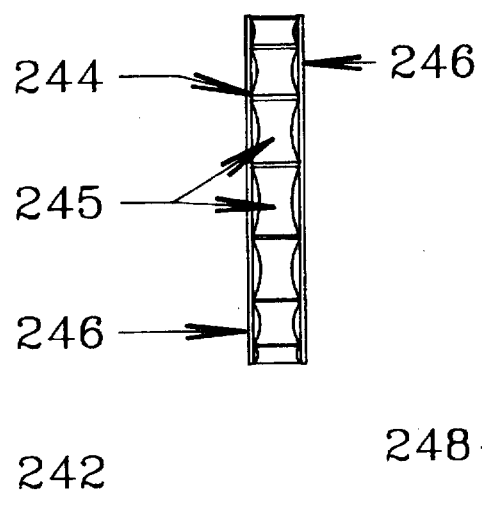
FIG. 39 generally illustrates a top or end view of the visible portion of a FIG. 38 type length of flexible material wrapped around and into the V-groove of a smooth V-groove pulley so as to make the formerly smooth V-groove pulley perform like a notched V-groove pulley.

FIG. 39 generally illustrates a top or end view of the visible portion of a FIG. 38 type length of flexible material wrapped around and into the V-groove of a smooth V-groove pulley so as to make the formerly smooth V-groove pulley perform like a notched V-groove pulley. Ridges are indicated by "244." Troughs are indicated by "245." Parallel sides of the flexible material are indicated by "246."

Figure 40:
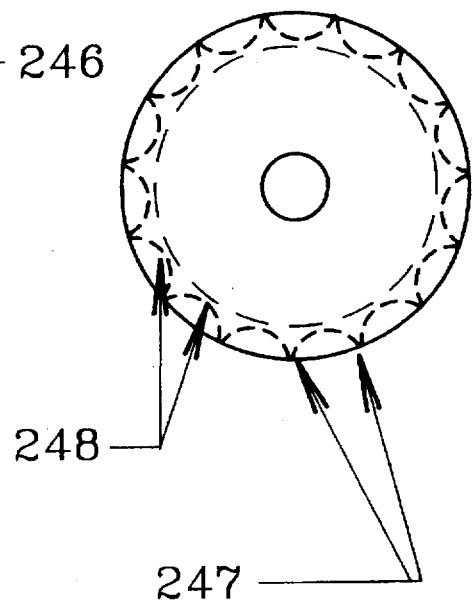
FIG. 40 generally illustrates a side view of a smooth V-groove pulley into the groove of which has been fitted a FIG. 38 type length of flexible material so as to make the formerly smooth V-groove pulley perform like a notched V-groove pulley.

FIG. 40 generally illustrates a side view of a smooth V-groove pulley into the groove of which has been fitted a FIG. 38 type length of flexible material so as to make the formerly smooth V-groove pulley perform like a notched V-groove pulley. Ridges are indicated by "247." Troughs are indicated by "248." "249" is reserved, not shown.

Figure 41:
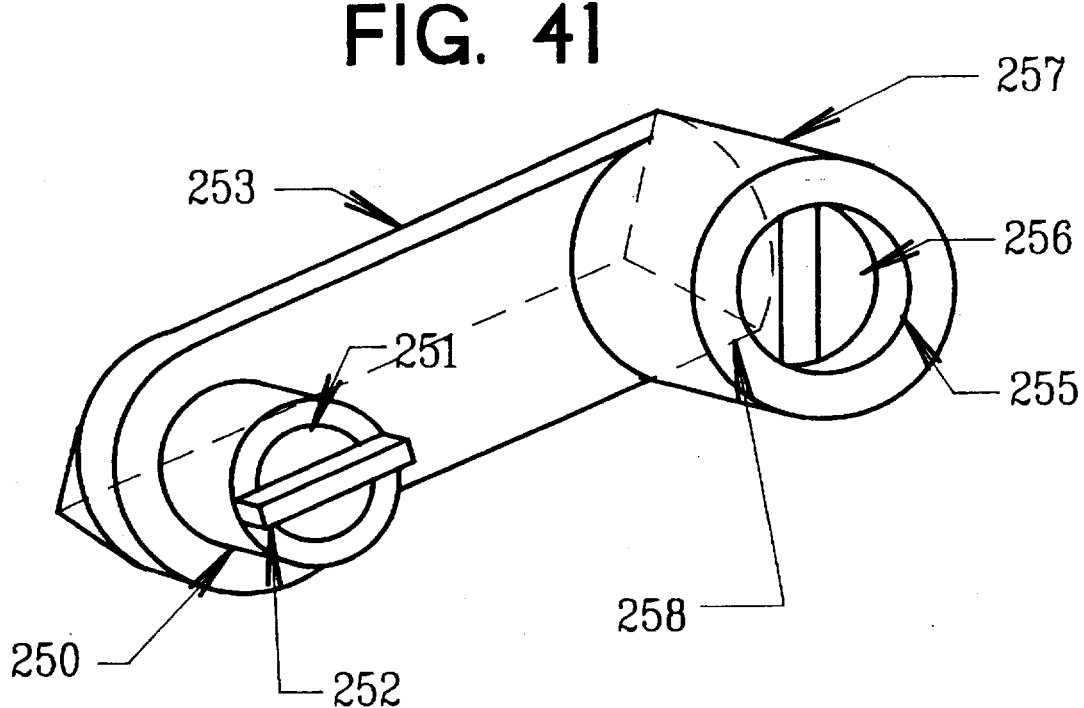
FIG. 41 generally illustrates an angle view of a chain module type designed to connect in a left-right alternating manner, the modules connectable and disconnectable when, and only when, they are at more or less right angles to one another.

FIG. 41 generally illustrates an angle view of a chain module type designed to connect in a left-right alternating manner, the modules connectable and disconnectable when, and only when, they are at more or less right angles to one another. "250" is the pin. "251" is the key shaft. "252" is the key. "253" is the sidewall, here shaped so that a chain of these modules will conform to the V-groove of a pulley. "257" is the barrel, which contains a socket, "255," within which can turn the pin of an adjoining module. Inside the socket is a keyway, "256." The key permits adjoining modules to be coupled and uncoupled only when they are held at right angles to one another, an angle not likely to occur when the chain of these modules is under tension in use.

Figure 42:
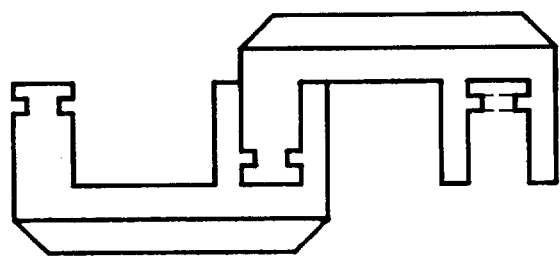
FIG. 42 generally illustrates a top view of two FIG. 41 type modules connected together.

FIG. 42 generally illustrates a top view of two FIG. 41 type modules connected together. FIGS. 43–52 are metal insert versions of some of the foregoing.

Figure 43:
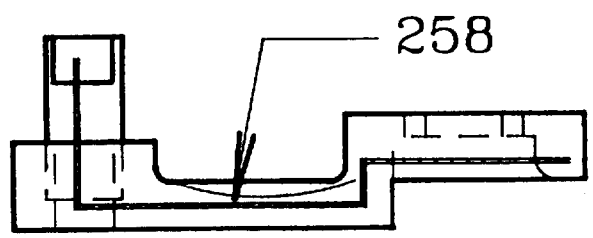

FIG. 43 generally illustrates one symmetrical half of a single module, or link, of the chain in a preferred FIG. 1 type embodiment viewed from above, as in FIG. 2, with metal inside plastic. The strength-reinforcing metal is shown as "258."

Figure 44:
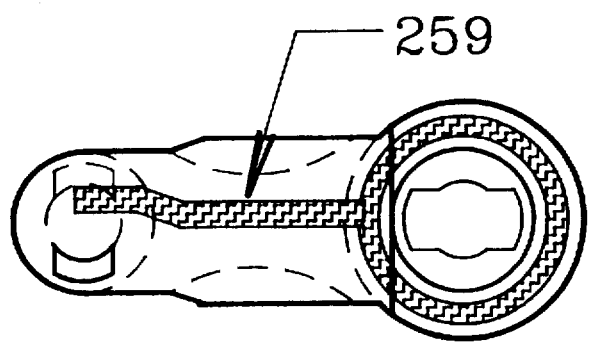

FIG. 44 generally illustrates one symmetrical half of a single module, or link, of the chain in a preferred FIG. 1 type embodiment viewed from the side, as in FIG. 3, with metal inside plastic. The strength-reinforcing metal is shown as "259."

Figure 45:
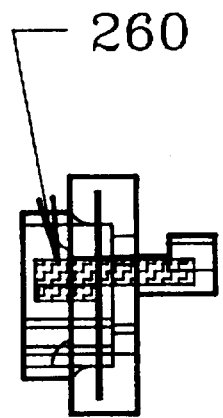

FIG. 45 generally illustrates one symmetrical half of a single module, or link, of the chain in a preferred FIG. 1 type embodiment viewed from the female end, as in FIG. 4, with metal inside plastic. The strength-reinforcing metal is shown as "260."

FIG. 46 generally illustrates a single module of the belt (link of the chain) in a preferred V-belt style embodiment viewed from one side, with metal inside plastic. The drawing compares to FIG. 20 above, to which is added a reinforcing metal insert, "261."

FIG. 47 generally illustrates a single module of the belt (link of the chain) in a preferred V-belt style embodiment viewed from above, with metal inside plastic. The drawing compares to FIG. 21 above, to which is added a reinforcing metal insert, "262."

FIG. 48 generally illustrates a single module of the belt (link of the chain) in a preferred V-belt style embodiment viewed from one end, with metal inside plastic. The drawing compares to FIG. 22 above, to which is added a reinforcing metal insert, "263."

FIG. 49 generally illustrates a side view of a single module of the belt (link of the chain) in a preferred embodiment where a notched pulley is to be utilized, with metal inside plastic. The drawing compares to FIG. 32 above, to which is added a reinforcing metal insert, "264."

FIG. 50 generally illustrates a top view of a FIG. 49 type single module of the belt (link of the chain) in a preferred embodiment where a notched pulley is to be utilized. The drawing compares to FIG. 33 above, to which is added a reinforcing metal insert, "265."

FIG. 51 generally illustrates an end view of a FIG. 49 type module in a preferred embodiment where a notched pulley is to be utilized. The drawing compares to FIG. 34 above, to which is added a reinforcing metal insert, "266."

Figure 52:
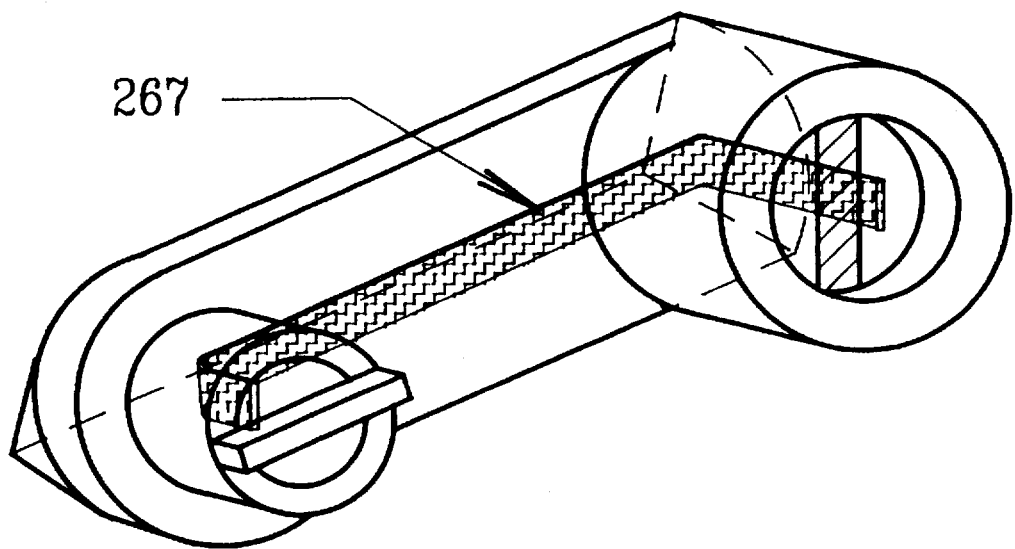

FIG. 52 generally illustrates an angle view of a ferroplastic chain module type designed to connect in a left-right alternating manner, the modules connectable and disconnectable when, and only when, they are at more or less right angles to one another. The drawing compares to FIG. 41 above, to which is added a reinforcing metal insert, "267."

Figure 53:
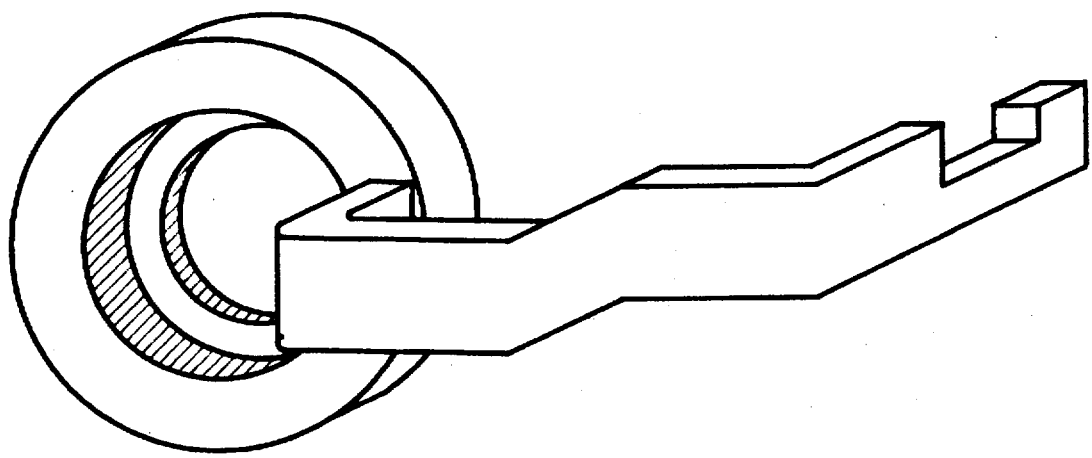
FIG. 53 generally illustrates an angle view of a metal insert for use modules of the type shown in FIGS. 42 through 44.

FIG 53 generally illustrates an angle view of a metal insert for use modules of the type shown in FIGS. 42 through 44.

It is to be understood that the above description is intended to be illustrative and not restrictive. The bicycle chain applications are those which have been emphasized in the above specifications but are no means exclusive. Among the many other contemplated applications are included the following: tow chains, jewelry bracelets and necklaces, garment belts, purse straps, valise handles, washing machine and drier belt or chains, automotive drive and timing belts and chains, etc. The scope of the invention should, therefore, be considered not as limited by the above description, but instead with reference to the appended claims, along with the full scope of equivalents to which they are entitled.

What is claimed is:

1. An endless chain, comprising a series of modules connected in end to end succeeding relationship, each individual module formed of one or more metal reinforcing members and a plastic casing molded around and generally in the shape of each such metal reinforcing member, which module, while assembled, is without moving parts, and each pair of adjacent modules having at least one transverse pin integrally formed with and extending from one module into at least one transverse pin-receiving socket of the other module so as to form a joint between the modules, each such joint being rotatable generally in a single plane perpendicular to said pin of the joint so formed.

2. The chain of claim 1, wherein at least one transverse pin-receiving socket lies within a channel which slants through the mass of the module, including means for preventing the unintended removal of a neighboring module's embraced pin from such channel.

3. The chain of claim 1, wherein at least half the modules are formed of a plurality of connected module components with means for assembling the components together to form a module in such a way as to engage the components with an end of a succeeding module to secure modules together in pivotal relationship, so that each pin of one module is embraced in a pin-receiving socket of a second and adjacent module.

4. The chain of claim 1, wherein each module defines a sprocket tooth receiving cavity between its two ends, to transmit torque between a plurality of sprocket wheels, and wherein the pins and sockets of each module are oriented parallel with respect to one another.

5. The chain of claim 1, wherein the means for joining together the plural pieces of at least some of the modules comprises one or more key shaped appendages extending from one piece and to fit into corresponding locks situated on another piece through sockets or keyways which, once the pieces have been assembled, are rotated so as to inhibit passage of the keys.

6. The endless chain of claim 4, further including at least one cluster of sprocket wheels, each sprocket wheel being made of metal-reinforced plastic, comprising:

one or more toothed concentric rings of differing diameter arranged around and connected to an axle in cascading stair-step fashion by size, the teeth on each of the rings a) extend outward from the center of said ring, b) are sized to correspond to the sprocket holding cavities of the chain, c) are set apart by spaces sized to accomodate the chain's connecting links, and d) include a flattened driving edge generally perpendicular to the drive chain's connecting links.

7. An endless chain formed from a plurality of modules connected in end to end relationship, each individual module formed of plastic and being without moving parts, and each pair of adjacent modules having at least one transverse pin integrally formed with and extending from one module into at least one transverse pin-receiving socket of the other module so as to form a joint between the modules, each such joint being rotatable generally in a single plane perpendicular to said pin of the joint so formed, and wherein the pins and sockets of each module are oriented parallel with respect to one another, and wherein each module defines a body portion fitted in transverse cross section to the surfaces of one or more V-belt pulleys so that the chain, encircling a plurality of such pulleys is capable of transmitting torque between them.

8. The chain of claim 7, wherein the module components are made of a metal reinforcing member generally in the shape of the module component, and a plastic casing molded around the metal reinforcing member.

9. The chain of claim 7, wherein at least one transverse pin-receiving socket lies within a channel which slants through the mass of the module, including means for preventing the unintended removal of a neighboring module's embraced pin from such channel.

10. The chain of claim 7, wherein at least half the modules are formed of a plurality of pieces, each piece of every multi-part module being integrally formed and having means for being joined together with the other pieces of such module so that each pin of one module is embraced in a pin-receiving socket of a second and adjacent module.

11. An endless cog chain, comprising a series of modules connected in end to end, succeeding relationship, each individual module formed of one or more plastic parts, which module, while assembled, is without moving parts, and each pair of adjacent modules having at least one transverse pin integrally formed with and extending from one module into at least one transverse pin-receiving socket of the other module so to form a joint between the modules, each such joint being rotatable generally in a single plane perpendicular to said pin of the joint so formed, and wherein the pins and sockets of each module are oriented parallel with respect to one another, and wherein each module of the cog chain defines a body portion fitted in longitudinal cross section to a cavity of a cog wheel so that the chain, encircling a plurality of such cog wheels is capable of transmitting torque between them.

12. The chain of claim 11, wherein each module component comprises a metal reinforcing member generally in the shape of the module component, and a plastic casing molded around the metal reinforcing member.

13. The chain of claim 11, wherein the cog chain modules are shaped in transverse cross section to conform in transverse cross section to a V-groove pulley.

14. The chain of claim 13, including a specialized V-groove pulley the interior of a groove of which rises and falls in a pattern corresponding in longitudinal cross section to a contours of the chain.

15. The chain of claim 13, including a device which may be installed within the groove of a conventional V-groove pulley to partially fill it so that it conforms in longitudinal cross section to the chain of claim 13, together with means by which the device may be so installed.

16. The chain of claim 11, wherein the transverse pin-receiving socket lies within a channel which slants through the mass of the module, including means for preventing the unintended removal of a neighboring module's embraced pin from such channel.

17. The chain of claim 11, wherein at least one module is formed of a plurality of pieces, each being integrally formed and having means for being joined together with the others so that each pin of one module is embraced in a pin-receiving socket of a second and adjacent module.

18. The chain of claim 11, wherein half the modules have pins at both of their two ends, and half the modules, which in assembly alternate with the first kind, have pin-receiving sockets at both of their ends.

19. The chain of claim 1, wherein at least one module is made of metal alone.

20. The chain of claim 1, wherein the rotatable joints at the two ends of at least some of the modules are oriented in planes that are not parallel to one another.

* * * * *